United States Patent
Pfaendner

(10) Patent No.: US 12,398,256 B2
(45) Date of Patent: Aug. 26, 2025

(54) METHOD FOR STABILIZING THERMOPLASTIC RECYCLATES, STABILIZED PLASTIC COMPOSITIONS, AND MOLDING COMPOUNDS AND MOLDED PARTS PRODUCED THEREFROM

(71) Applicant: FRAUNHOFER-GESELLSCHAFT ZUR FÖRDERUNG DER ANGEWANDTEN FORSCHUNG E. V., Munich (DE)

(72) Inventor: Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 626 days.

(21) Appl. No.: 17/441,626

(22) PCT Filed: Mar. 24, 2020

(86) PCT No.: PCT/EP2020/058188
§ 371 (c)(1),
(2) Date: Sep. 21, 2021

(87) PCT Pub. No.: WO2020/193563
PCT Pub. Date: Oct. 1, 2020

(65) Prior Publication Data
US 2022/0162422 A1    May 26, 2022

(30) Foreign Application Priority Data
Mar. 26, 2019   (DE) .................... 10 2019 204 160.4

(51) Int. Cl.
| C08K 5/20 | (2006.01) |
| C08J 3/20 | (2006.01) |
| C08K 5/06 | (2006.01) |
| C08K 5/103 | (2006.01) |
| C08K 5/11 | (2006.01) |
| C08K 5/12 | (2006.01) |
| C08K 5/13 | (2006.01) |
| C08K 5/151 | (2006.01) |
| C08K 5/17 | (2006.01) |

(52) U.S. Cl.
CPC .............. C08K 5/20 (2013.01); C08J 3/203 (2013.01); C08K 5/06 (2013.01); C08K 5/103 (2013.01); C08K 5/11 (2013.01); C08K 5/12 (2013.01); C08K 5/13 (2013.01); C08K 5/151 (2013.01); C08K 5/17 (2013.01); C08K 2201/014 (2013.01)

(58) Field of Classification Search
CPC .................................................... C08K 5/103
See application file for complete search history.

(56) References Cited

U.S. PATENT DOCUMENTS

| 3,951,945 A | 4/1976 | Heesen et al. |
| 5,298,540 A | 3/1994 | Pauquet et al. |
| 5,789,470 A | 8/1998 | Herbst et al. |
| 5,804,623 A * | 9/1998 | Hoffmann .............. C08K 5/524 524/400 |
| 6,251,972 B1 | 6/2001 | Hoffmann et al. |
| 6,355,713 B1 | 3/2002 | Luitjes et al. |
| 6,525,158 B1 | 2/2003 | Hoffmann et al. |
| 10,138,354 B2 | 11/2018 | Groos et al. |
| 10,214,631 B2 | 2/2019 | Pfaendner et al. |
| 10,323,136 B2 | 6/2019 | Pfaendner et al. |
| 10,364,340 B2 | 7/2019 | Pfaendner et al. |
| 10,370,537 B2 | 8/2019 | Pfaendner et al. |
| 10,450,442 B2 | 10/2019 | Pfaendner et al. |
| 10,544,284 B2 | 1/2020 | Pfaendner et al. |
| 10,781,296 B2 | 9/2020 | Groos et al. |
| 10,913,743 B2 | 2/2021 | Pfaendner et al. |
| 11,292,859 B2 | 4/2022 | Klein et al. |
| 11,407,720 B2 | 8/2022 | Fischer et al. |
| 11,591,450 B2 | 2/2023 | Pfaendner et al. |
| 11,634,560 B2 | 4/2023 | Ciesielski et al. |
| 11,760,865 B2 | 9/2023 | Pfaendner et al. |
| 2006/0148941 A1 | 7/2006 | Wehner et al. |
| 2010/0179264 A1 | 7/2010 | Kimura et al. |
| 2015/0099839 A1 | 4/2015 | Benighaus et al. |

(Continued)

FOREIGN PATENT DOCUMENTS

| CN | 107001698 A | 8/2017 |
| CN | 107207773 A | 9/2017 |

(Continued)

OTHER PUBLICATIONS

US 11,358,941 B2, 06/2022, Klein et al. (withdrawn)
Machine translation of CN-107805335-A (Year: 2018).*
Machine translation of JP-2011207990-A (Year: 2011).*
Artamonov et al., "Synthesis of D-Mannite Esters of Aliphatic and Aromatic Acids," *Chemistry of Natural Compounds* 37(2): 124-126 (2001).
Luzuriaga et al., "Degradation of pre-aged polymers exposed to simulated recycling: Properties and thermal stability," *Polymer Degradation and Stability* 91(6): 1226-1232 (2006).

(Continued)

*Primary Examiner* — Wenwen Cai
(74) *Attorney, Agent, or Firm* — Leydig, Voit & Mayer, Ltd.

(57) ABSTRACT

The invention relates to a method for stabilizing thermoplastic recyclates or previously damaged plastic materials against oxidative, thermal and/or actinic degradation. According to the claimed method, at least one substituted sugar, selected from the group consisting of at least one ester and/or ether of an alditol or cyclitol, at least one ester of a saccharic acid, at least one amide and/or substituted amine of an amine sugar, and mixtures and combinations thereof, as the stabilizing component is introduced in a thermoplastic recyclate and optionally additionally at least one primary antioxidant and/or at least one secondary antioxidant is introduced in a thermoplastic recyclate.

28 Claims, No Drawings

(56) References Cited

U.S. PATENT DOCUMENTS

| | | |
|---|---|---|
| 2016/0052927 A1 | 2/2016 | Pfaendner et al. |
| 2016/0272789 A1 | 9/2016 | Pfaendner et al. |
| 2017/0107375 A1 | 4/2017 | Pfaendner et al. |
| 2017/0121499 A1 | 5/2017 | Pfaendner et al. |
| 2017/0260362 A1 | 9/2017 | Pfaendner et al. |
| 2017/0260363 A1 | 9/2017 | Pfaendner et al. |
| 2017/0260366 A1 | 9/2017 | Pfaendner et al. |
| 2017/0267835 A1 | 9/2017 | Groos et al. |
| 2018/0186970 A1 | 7/2018 | Groos et al. |
| 2019/0248927 A1 | 8/2019 | Klein et al. |
| 2020/0231783 A1 | 7/2020 | Pfaendner et al. |
| 2020/0317886 A1 | 10/2020 | Pfaendner et al. |
| 2020/0361879 A1 | 11/2020 | Fischer et al. |
| 2021/0130582 A1 | 5/2021 | Ciesielski et al. |
| 2021/0388176 A1 | 12/2021 | Metzsch-Zilligen et al. |
| 2022/0073734 A1 | 3/2022 | Polidar et al. |
| 2022/0119624 A1 | 4/2022 | Pfaendner et al. |
| 2022/0162422 A1 | 5/2022 | Pfaendner |
| 2022/0267568 A1 | 8/2022 | Pfaendner |
| 2022/0340717 A1 | 10/2022 | Olschewski et al. |
| 2023/0117792 A1 | 4/2023 | Pfaendner et al. |
| 2023/0119120 A1 | 4/2023 | Pfaendner et al. |
| 2023/0203274 A1 | 6/2023 | Polidar et al. |
| 2024/0026124 A1 | 1/2024 | Pfaendner |
| 2024/0043745 A1 | 2/2024 | Mayer et al. |
| 2024/0174840 A1 | 5/2024 | Pfaendner et al. |

FOREIGN PATENT DOCUMENTS

| | | | |
|---|---|---|---|
| CN | 107805335 A | * 3/2018 | ............... C08J 5/18 |
| DE | 2423278 A1 | 12/1974 | |
| DE | 288161 A5 | 3/1991 | |
| DE | 102017217312 A1 | 3/2019 | |
| EP | 0 470 048 A2 | 2/1992 | |
| EP | 0 506 614 A2 | 9/1992 | |
| EP | 0 702 704 A1 | 3/1996 | |
| EP | 0 881 253 A | 12/1998 | |
| EP | 1 426 406 A | 6/2004 | |
| EP | 0 662 101 B1 | 5/2009 | |
| EP | 2 641 933 A | 9/2013 | |
| EP | 3 947 540 B1 | 8/2023 | |
| JP | H09-176416 A | 7/1997 | |
| JP | 2002-501564 A | 1/2002 | |
| JP | 2005-179517 A | 7/2005 | |
| JP | 2009-196256 A | 9/2009 | |
| JP | 2011-122131 A | 6/2011 | |
| JP | 2011-153251 A | 8/2011 | |
| JP | 2011-207798 A | 10/2011 | |
| JP | 2011207990 A | * 10/2011 | |
| JP | 2014-173059 A | 9/2014 | |
| JP | 2015-510961 A | 4/2015 | |
| JP | 2017-171774 A | 9/2017 | |
| KR | 2001-0013066 A | 2/2001 | |
| KR | 2014-0141591 A | 12/2014 | |
| WO | WO 97/30112 A2 | 8/1997 | |
| WO | WO 2014/141178 A1 | 9/2014 | |
| WO | WO 2016/081823 A1 | 5/2016 | |

OTHER PUBLICATIONS

Reinefeld et al., "Zur selektiven Veresterung von D-Mannit: Darstellung grenzflächenaktiver D-Mannit-partialester höherer Fettsäuren," ("Selective esterification of D-mannitol. Preparation of surface-active D-mannitol partial esters of higher fatty acids") *Tenside Surfactants Detergents* 5(9-10): 266-270 (1968).
Watanabe et al., "Regioselective functionalization of unprotected myo-inositol by electrophilic substitution," *Tetrahedron* 69(23): 4657-4664 (2013).
Wei et al., "Biocatalytic synthesis of ultra-long-chain fatty acid sugar alcohol monoesters," *Green Chemistry* 17(6): 3475-3489 (2015).
Japan Patent Office, Notification of Reasons for Refusal in Japanese Patent Application No. 2021-557172 (Dec. 26, 2023).

U.S. Appl. No. 17/906,080, filed Sep. 12, 2022.
U.S. Appl. No. 17/907,038, filed Sep. 22, 2022.
U.S. Appl. No. 17/995,978, filed Oct. 11, 2022.
U.S. Appl. No. 17/996,747, filed Oct. 20, 2022.
U.S. Appl. No. 18/245,065, filed Mar. 13, 2023.
U.S. Appl. No. 18/251,255, filed May 1, 2023.
China National Intellectual Property Administration, First Office Action in Chinese Patent Application No. 2020800246490 (Apr. 28, 2023).
Craig et al., "Mechanical properties of photo-degraded recycled photo-degraded polyolefins," *J. Mater. Sci.* 41(3): 993-1006 (2006).
Maxwell, "Weathering of recycled photo-degraded polyethylene," *Polym. Eng. Sci.* 48(2): 381-385 (2008).
Pfaendner, "Improving the Quality of Recycled Materials," *Kunststoffe International* Dec. 2015: 41-44 (2015).
Pospisil et al., "Chain-breaking stabilizers in polymers: the current status," *Polymer Degradation and Stability* 49(1): 99-110 (1995).
Richaud et al., "Polyethylene stabilization against thermal oxidation by a trimethylquinoleine oligomer," *Polymer Degradation and Stability* 94(3): 410-420 (2009).
German Patent Office, Office Action in German Patent Application No. 10 2019 204 160.4 (Jul. 3, 2019).
European Patent Office, International Search Report in International Application No. PCT/EP2020/058188 (Jul. 1, 2020).
European Patent Office, Written Opinion in International Application No. PCT/EP2020/058188 (Jul. 1, 2020).
International Bureau of WIPO, International Preliminary Report on Patentability in International Application No. PCT/EP2020/058188 (Sep. 28, 2021).
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,445, filed Mar. 15, 2017.
U.S. Appl. No. 15/511,471, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/287,079, filed Apr. 20, 2021.
U.S. Appl. No. 17/423,800, filed Jul. 16, 2021.
U.S. Appl. No. 17/425,267, filed Jul. 22, 2021.
U.S. Appl. No. 17/625,387, filed Jan. 7, 2022.
U.S. Appl. No. 17/640,174, filed Mar. 3, 2022.
China National Intellectual Property Administration, Third Office Action in Chinese Patent Application No. 2020800246490 (Jun. 7, 2024).
China National Intellectual Property Administration, Second Office Action in Chinese Patent Application No. 2020800246490 (Nov. 9, 2023).
U.S. Appl. No. 18/708,977, filed May 9, 2024, Pfaendner et al.
U.S. Appl. No. 18/548,504, filed Aug. 31, 2023, Pfaendner et al.
U.S. Appl. No. 18/548,518, filed Aug. 31, 2023, Pfaendner et al.
U.S. Appl. No. 18/561,878, filed Nov. 17, 2023, Pfaendner et al.
*Recycling of Automotive Products*, Ming Chen ed., Shanghai Jiao Tong University Press, Jan. 2017, p. 203.
Japan Patent Office, Notice of Transfer of a Case for Reconsideration by Examiners Before Appeal Proceedings in Japanese Patent Application No. 2021-557172 (Sep. 3, 2024).
Japan Patent Office, Reconsideration Report (Preexam) in Japanese Patent Application No. 2021-557172 (Creation date: Sep. 11, 2024; JPO mailing date: Sep. 13, 2024).
Japan Patent Office, Notice of Termination of Reconsideration by Examiners Before Appeal Proceedings in Japanese Patent Application No. 2021-557172 (Oct. 1, 2024).
China National Intellectual Property Administration, Decision on Rejection in Chinese Patent Application No. 202080024649.0 (Oct. 13, 2024).

(56) References Cited

OTHER PUBLICATIONS

Allen et al., "Ageing and stabilisation of filled polymers: an overview," *Polymer Degradation and Stability* 61(2): 183-199 (1998).

Almond et al., "Determination of the carbonyl index of polyethylene and polypropylene using specified area under band methodology with ATR-FTIR spectroscopy," *e-Polymers* 20(1): 369-381 (2020).

Curtzwiler et al., "Certification markers for empirical quantification of post-consumer recycled content in extruded polyethylene film," *Polymer Testing* 65: 103-110 (2018).

Fodor et al., "Determination of Carbonyl-Containing Functional Groups in Oxidized Polyethylene," *J. Polym. Sci, Polym Chem Edition* 22: 2539-2550 (1984).

Hinsken et al., "Degradation of polyolefins during melt processing," *Polymer Degradation and Stability* 34(1-3): 279-293 (1991).

Jansson et al., "Chemical degradation of a polypropylene material exposed to simulated recycling," *Polymer Degradation and Stability* 84(2): 227-232 (2004).

La Mantia, "The Role of Additives in the Recycling of Polymers," *Macromol. Symp.* 135: 157-165 (1998).

Pfaendner et al., "Recycling and restabilization of polymers for high quality applications. An Overview," *Die Angew. Macromol. Chemie* 232(1): 193-227 (1995).

Pospíšil et al., "The Origin and Role of Structural Inhomogeneities and Impurities in Material Recycling of Plastics," *Macromol. Symp.* 135: 247-263 (1998).

Pospíšil et al., "Upgrading of recycled plastics by restabilization—an overview," *Polymer Degradation and Stability* 49(1): 99-110 (1995).

Rabello et al., "The role of physical structure and morphology in the photodegradation behaviour of polypropylene," *Polymer Degradation and Stability* 56(1): 55-73 (1997).

Santana et al., "Influence of Cleaning Conditions on the Degradation of Recycled HDPE," *J. Appl. Polym. Sci.* 112(3): 1454-1460 (2009).

Stangenberg et al., "Quality Assessments of Recycled Plastics by Spectroscopy and Chromatography," *Chromatographia* 59: 101-106 (2004).

Tao et al., "Mechanism of Microstructural Change of High-Density Polyethylene Under Different Outdoor Climates in China," *Journal of Polymers and the Environment* 28: 2616-2630 (2020).

Xin et al., "Gallate Derivatives as Antioxidant Additives for Polypropylene," *J. Appl. Polym. Sci.* 131(3): 39850 (2014).

Korean Intellectual Property Office, First Office Action in Korean Patent Application No. 10-2021-7034877 (Dec. 30, 2024).

\* cited by examiner

METHOD FOR STABILIZING THERMOPLASTIC RECYCLATES, STABILIZED PLASTIC COMPOSITIONS, AND MOLDING COMPOUNDS AND MOLDED PARTS PRODUCED THEREFROM

CROSS-REFERENCE TO RELATED APPLICATIONS

This patent application is the U.S. national phase of International Application No. PCT/EP2020/058188, filed on Mar. 24, 2020, which claims the benefit of German Patent Application No. 10 2019 204 160.4, filed Mar. 26, 2019, the disclosures of which are incorporated herein by reference in their entireties for all purposes.

BACKGROUND OF THE INVENTION

The present invention relates to a method for the stabilization of thermoplastic plastic recyclates or pre-damaged plastics against oxidative, thermal, and/or actinic degradation. In the method in accordance with the invention, at least one substituted sugar, selected from the group consisting of at least one ester and/or ether of an alditol having at least four carbon atoms or a cyclitol, at least one ester of a saccharic acid, at least one amide and/or substituted amine of an amino sugar, and mixtures and combinations thereof, is/are introduced as a stabilizing component into a thermoplastic plastic recyclate and, optionally additionally hereto, at least one primary antioxidant and/or at least one secondary antioxidant. Plastic recyclates can be stabilized against oxidative, thermal, and/or actinic degradation with a high efficiency and in a very environmentally friendly and inexpensive manner by the method in accordance with the invention. The present invention additionally also relates to corresponding recyclate-based plastic compositions and to molding compounds and molded parts produced therefrom. The present invention furthermore also relates to stabilizer compositions and to their use for the stabilization of thermoplastic plastic recyclates against oxidative, thermal, and/or actinic degradation Plastic recyclates are a growing market and an important element in recycling management of natural resources, with recyclates then ideally being intended to replace new plastics having an identical or at least comparable property profile. However, with recyclates from production or from waste plastics, irreversible changes in the polymer chain occur, often over many years, due to mechanochemical, chemical, or light induced processes during the first processing steps (e.g. compounding, injection molding) and during use, (see e.g. R. Pfaendner et al., Angew. Makromol. Chemie 1995, 232, 193-227; Pospisil et al., Pol. Degr. Stab. 1995, 48, 351-358). New chemical groups are produced in the polymer chain and/or the composition of the polymer is changed by radical reactions in the presence of oxygen. The concentration of these newly formed groups increases with the length of use and the area of use (UV light, high temperatures, contact media). The structural inhomogeneities of a recyclate then influence the plastic properties such as the mechanical and physical properties and the processing behavior.

It furthermore applies that recyclates or pre-damaged plastics are more sensitive to oxidation than new material since degradation products act as initiator sites for a further oxidation or as prodegrants (A. S. Maxwell, Pol. Eng. Sci. 2008, 381-385; I. H. Craig, J. R. White, J. Mater. Sci. 2006, 41, 993-1006; L. Luzuriaga, J. Kovarova, I. Fortelny, Pol. Degr. Stab. 2006, 91, 1226-1232). Post-stabilization with selected stabilizers is an important method to achieve a quality improvement of plastic recyclates. The stabilizers used protect the recyclate from further oxidative (or photooxidative) damage. The optimized stabilizer composition for a recyclate, however, differs due to the described structural deviations from the stabilization composition of the new product (see e.g. R. Pfaendner, Kunststoffe International 12/2015, 41-44).

Due to the differences now acknowledged between new plastic products and plastic recyclates, special recyclate stabilizer compositions have become known and are also available as commercial products (e.g. the Recyclostab series of BYK (Chemie GmbH, Wesel). Known technical stabilization solutions that take account of the demands of recyclates are, for example:

Stabilization composition consisting of a phenolic antioxidant, a phosphite, and a fatty acid salt (EP 0662101).

Stabilization composition consisting of a phenolic antioxidant, a phosphite, and a metal oxide such as calcium oxide (U.S. Pat. Nos. 6,525,158, and 6,251,972).

Stabilization composition consisting of a phenolic antioxidant and a polyfunctional epoxide (EP 0702704).

Stabilization by a macrocyclic piperidine (U.S. Pat. No. 5,789,470).

Stabilization composition consisting of a secondary aromatic amine and a polyfunctional epoxide (WO 97/30112).

Discoloration of damaged polyolefins by a hydroxylamine (EP 470048).

Mixture of antioxidants, mold lubricants, anti-blocking agents, UV stabilizers, and antistatic agents for recyclate films (DD 288161).

Stabilization composition for mixed plastics consisting of a phenolic antioxidant and a phosphite/phosphonite (EP 0506614).

Stabilization of polycarbonate blends comprising postconsumer polystyrene recyclates by acids (WO 2014/141178).

Stabilization of halogenated recyclates by 6-aminouracils (EP 1 426 406)

Despite the known solutions, there is still a need for particularly high performance or effective, environmentally friendly, and inexpensive options for the stabilization of plastic recyclates or stabilizer compositions usable therefor.

Recyclates have here already run through a life cycle and had already been compounded to form molded plastic parts and as such exposed to mechanical, chemical, actinic, and/or oxidative loads. Specific defects hereby result in the polymer chain that effect further, disproportionate damage to the underlying plastic material on a repeat processing of the recyclates. The damage points present in the polymer here serve as initiator points for an accelerated and expanded degradation of the polymer. A lowering of the molecular weight, a broadening of the molecular weight distribution, a reduction in the mechanical properties, and an increase in the light sensitivity are in particular typical phenomena that occur with recycled plastics, in particular on their repeat processing. The property profile that has worsened overall is thus more disadvantageous for a repeat processing.

SUMMARY OF THE INVENTION

Starting from this, it was thus the object of the present invention to provide a method for the stabilization of thermoplastic plastic recyclates by which the plastic recyclates can be stabilized against oxidative, thermal, and/or actinic degradation in a very effective, environmentally friendly and inexpensive manner.

This object is achieved by a method for the stabilization of thermoplastic plastic recyclates described herein, by the features of the plastic composition described herein, by the features of the molded part manufactured from the plastic composition described herein, by the features of the stabilizer composition described herein, by the use of a substituted sugar and the use of the stabilizer compositions also described herein, as well as the advantageous further developments also described herein.

DETAILED DESCRIPTION OF THE INVENTION

In accordance with the invention, a method is thus provided for the stabilization of thermoplastic plastic recyclates against oxidative, thermal, and/or actinic degradation in which at least one substituted sugar, selected from the group consisting of
- (a1) at least one ester and/or ether of an alditol having at least four carbon atoms or a cyclitol;
- (a2) at least one ester of a saccharic acid; and/or
- (a3) at least one amide and/or substituted amine of an amino sugar, and mixtures and combinations thereof (also called "component (A)" in the following) is/are introduced into the thermoplastic plastic recyclate.

The substituted sugars can respectively be chemically pure esters, ethers, and amides. It is equally possible that the respective substituted sugars have a mixed substitution pattern. It is, for example, possible that a substituted sugar comprises both an ester functionalization and an amide functionalization.

The substituent(s) of the substituted sugars can be aliphatic, aromatic, or cycloaliphatic hydrocarbon groups, optionally interrupted by oxygen atoms, sulfur atoms, or nitrogen atoms; groups having at least four, particularly preferably having at least six, $CH_2$ groups are preferred.

The preparation of the substituted sugars can take place in accordance with known methods that are e.g. described in the following citations:
- E. Reinefeld, G. Klaunberg, Tenside 1968, 5 (9-10), 266-270
- DE 2423278, B. V. Chemie Combinatie Amsterdam C.C.A.
- A. F. Artamanov et al. Chemistry of Natural Compounds, 2001, 37, 124-125 A preferred preparation method is here regioselective via enzymatic processes:
- Y. Watanabe et al., Tetrahedron 2013, 69, 4657-4664
- W. Wei et al. Green Chemistry 2015, 17, 3475-3489

Since the thermoplastics forming the basis of the plastic recyclates had as a rule already had primary and/or secondary antioxidants on their manufacture, it is therefore not absolutely necessary in the reprocessing of consumed or already used plastics, that is recyclates, to again add primary and/or secondary antioxidants in the reprocessing of these recyclates. It has surprisingly been found that it is sufficient to incorporate at least one substituted sugar such as defined above into the plastic recyclates to achieve a stabilizing effect that is particularly high in a synergetic manner in the presence of primary and/or secondary oxidants.

In accordance with the present invention, a plastic recyclate is understood as a recycled plastic in accordance with the definition of the term as per the standard DIN EN 15347:2007. Furthermore, relevant international standards exist for many kinds of plastic recyclates. DIN EN 15353: 2007 is, for example, relevant to PET plastic recyclates. PS recyclates are described in more detail in DIN EN 15342: 2008. PE recyclates are treated in DIN EN 15344:2008. PP recyclates are characterized in DIN EN 15345:2008. For the purposes of the corresponding specific plastic-recyclates, the present invention incorporates the definitions of these international standards.

Unlike new plastics, plastic recyclates usually have pre-damage, i.e. new chemical groups are produced on the polymer chain by oxidative or (photo) oxidative processes. With polyolefins, these are e.g. carbonyl groups that are not present or are only present to a highly subordinate degree with new products. The concentration of the carbonyl groups is therefore simultaneously a measure for the pre-damage of the polymer. The concentration of carbonyl groups can be determined in accordance with known analytical methods such as infrared spectroscopy, such as is described in E. Richaud et al. Pol. Degr. Stab. 2009, 94, 410-420. In this case, the absorption of the carbonyl vibration in the region of 1720 cm-1 is measured.

A preferred embodiment of the method in accordance with the invention provides that the at least one substituted sugar comprises three, preferably at least four, free OH groups.

It is equally advantageous if the at least one substituted sugar is mono- or disubstituted.

Monosubstituted compounds are very particularly preferred.

In accordance with a preferred embodiment, the alditol from which the substituted sugars are derived has the molecular formula $$HOCH_2[CH(OH)]_nCH_2OH,$$

$$R_1-OCH_2[CH(OH)]_nCH_2OH, \text{ or}$$

$$HOCH_2[CH(OH)]_n[CH(OR_1)]CH_2OH$$

where n=2-6, preferably n=3-5, where $R_1$ is an optionally substituted sugar residue.

The at least one alditol is preferably derived from alditols selected from the group consisting of threitol, erythritol, galactitol, mannitol, ribitol, sorbitol, xylitol, arabitol, ismaltol, lactitol, maltitol maltotritol, and hydrated oligosaccharides and polysaccharides with polyol end groups and mixtures thereof. The at least one preferred alditol is particularly preferably selected from the group consisting of erythritol, mannitol, isomaltol, maltitol, and mixtures thereof. The at least one alditol is very particularly preferably mannitol or the cyclitol is myo-inositol.

Examples for heptitols and octitols as starting products for the substituted derivatives are: meso-glycero-allo-heptitol, D-glycero-D-altro-heptitol, D-glycero-D-manno-heptitol, meso-glycero-gulo-heptitol, D-glycero-D-galacto-heptitol (perseitol), D-glycero-D-gluco-heptitol, L-glycero-D-gluco heptitol, D-erythro-L-galacto-octitol, D-threo-L-galacto-octitol. Alternatively or additionally to the above-named alditols, cyclitols, i.e. ring-shaped polyols, can also be used as starting materials for the preparation of the substituted sugars in the method in accordance with the invention (or for the purposes of the plastic composition, the molding compound, or the molded part or the stabilizer composition in accordance with the invention).

The at least one cyclitol for the starting material for the preparation of the substituted sugars is further advantageously selected from the group consisting of inositol, quercitol, viscumitol, bornesitol, conduritol, ononitol, pinitol, prinpolitol, cerceritol, querbrachitol, quinic acid, shikimic acid, and valienol, with the at least one cyclitol preferably being myo-inositol.

The at least one ester of the saccharic acid is further advantageously an aldonic acid or an aldaric acid. Starting materials for the preparation of the substituted saccharic acids are, for example, the aldonic acids allonic acids altronic acid, gluconic acid, mannonic acid, gulonic acid, idonic acid, galactonic acid, talonic acid, ribonic acid, arabonic acid, xylonic acid, lyxonic acid, erythronic acid, or threonic acid. Examples for preferred aldaric acids are mucic acid or glucaric acid.

The at least one substituted amine or amide is further advantageously an amino sugar. Starting materials for the preparation of the substituted amino sugars are, for example 1-amino-1-deoxy-alditols such as 1-amino-1-deoxy-galactinol, 1-amino-1-deoxy-mannitol, 1-amino-1-deoxy-sorbitol, 1-amino-1-deoxy-maltitol. Examples for disubstituted amino sugars are e.g. derived from alpha-omega-diamino-alpha-omega-dideoxyalditols; 1,6-diamino-1, 6-dideoxysorbitol is an example.

Preferred substituents are linear or branched hydrocarbon chains having at least six CH groups such as hexyl, heptyl, octyl, nonyl, decyl, isodecyl, lauryl, stearyl, myristyl, oleyl, cetyl, ceryl, myricyl, palmitoleyl, arachidyl, behenyl, eruycl, lignoceryl, montanyl, linoleyl, isotridecyl.

The at least one substituted sugar is in particular selected from the group consisting of the following compounds:

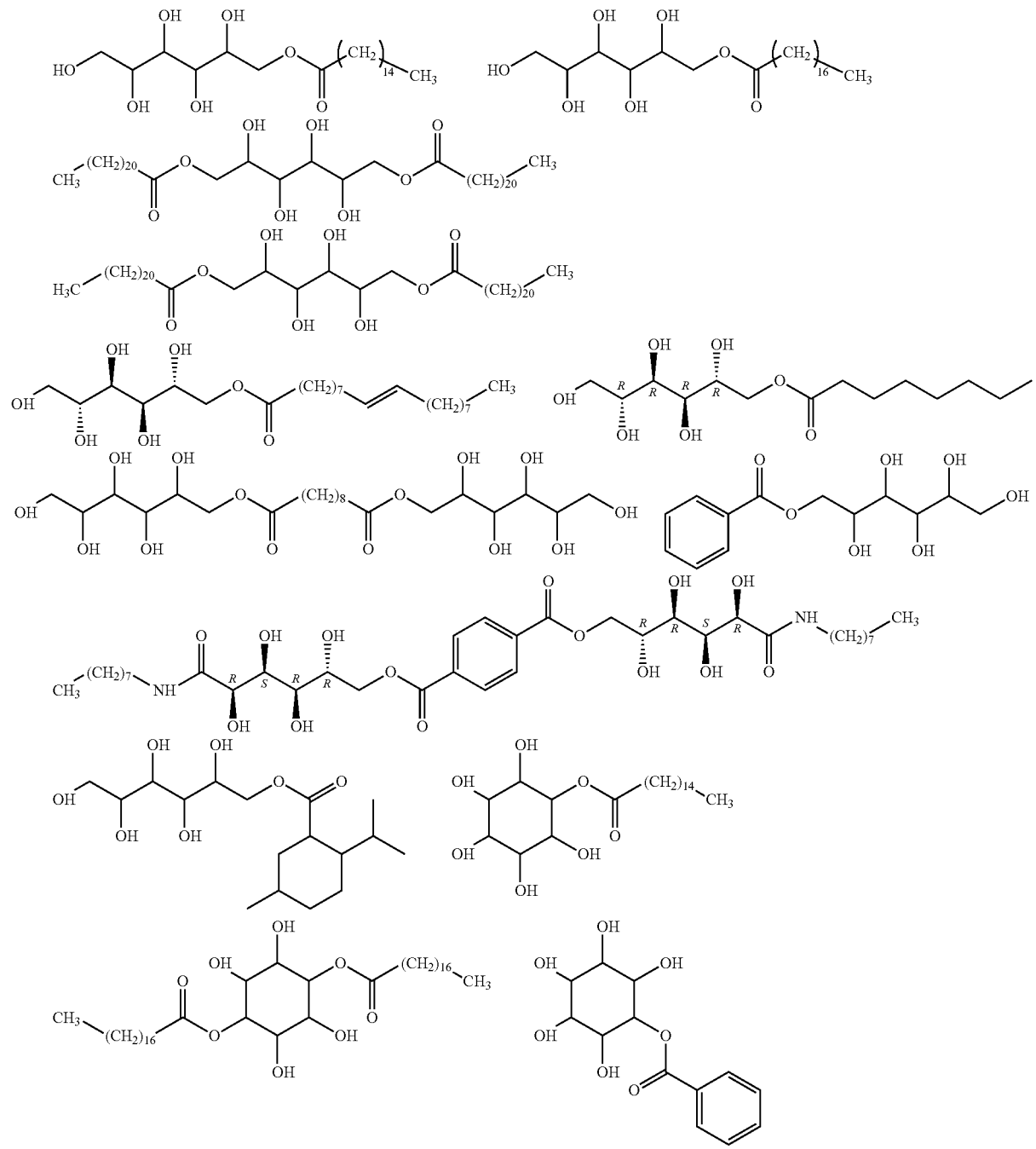

-continued

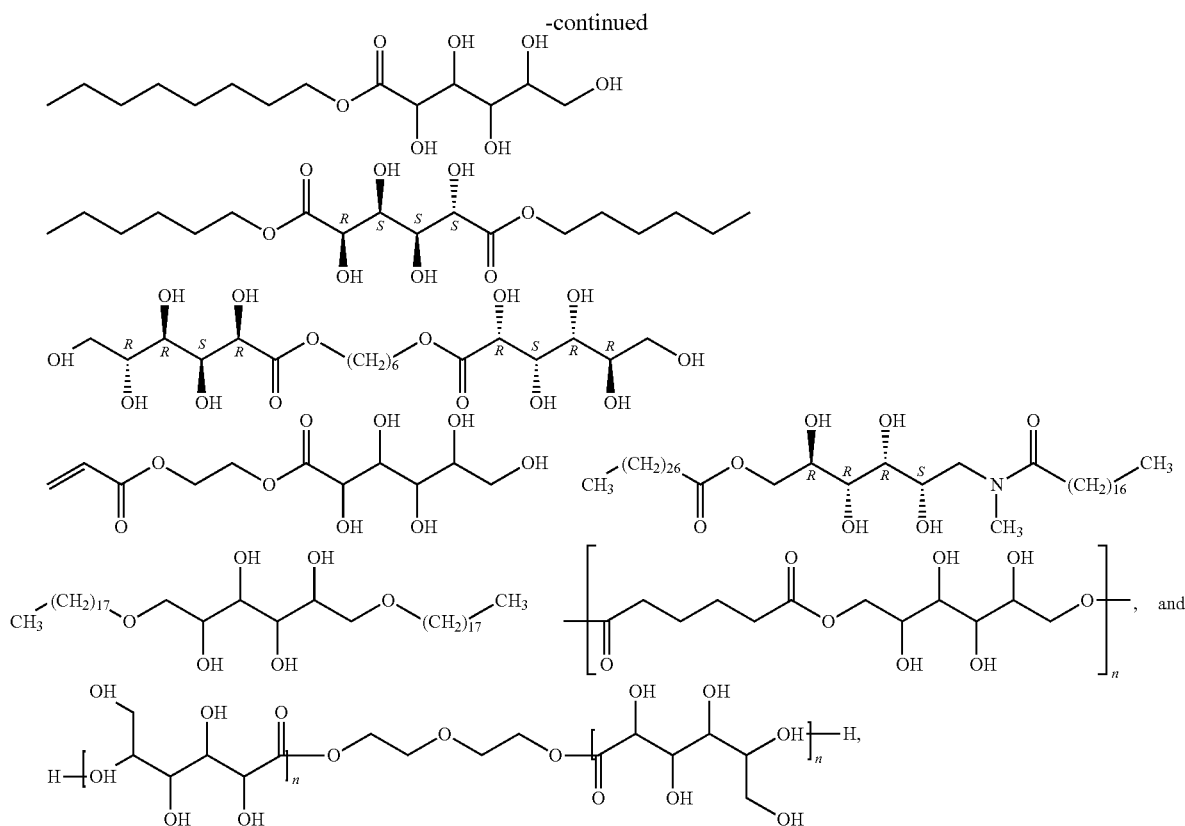

where n is the same or different on every occurrence and is a whole number between 1 and 100, preferably 2-50, very particularly preferably 3-20.

0.01 to 5.0 parts by weight, preferably 0.02 to 1.0 parts by weight, of the at least one substituted sugar (component (A)) are in particular introduced relative to the 95.0 to 99.99 parts by weight, preferably 99.0 to 99.98 parts by weight, of the thermoplastic plastic recyclate.

A preferred embodiment of the method provides that in addition to the at least one substituted sugar, at least one primary antioxidant and/or at least one secondary antioxidant (B)) is/are introduced into the thermoplastic plastic recyclate. Components (A) and (B) can here be introduced into the plastic recyclate individually or separately from one another, or components (A) and (B) can be introduced into the plastic recyclate together in the form of a composition comprising components (A) and (B) or in the form of a composition consisting of components (A) and (B).

At least one primary antioxidant (component (B1)), or
at least one secondary antioxidant (component (B2)), or
at least one primary antioxidant and at least one secondary antioxidant is used as component (B).

In the event that at least one primary antioxidant and at least one secondary antioxidant are used, they can also be introduced into the plastic recyclate individually or separately from one another or together in the form of a mixture.

Component (A) used in accordance with the invention and optionally component (B) used in addition to component (A) acts or act together as a stabilizer for the thermoplastic plastic recyclate, with the oxidative, thermal, and/or actinic degradation of the thermoplastic plastic recyclate being inhibited or prevented. In other words, the plastic is stabilized against oxidative, thermal, and/or actinic degradation by the introduction of component (A) and optionally additionally of component (B) into the thermoplastic plastic recyclate.

The present invention is here particularly characterized in that the at least one substituted sugar is used alone or together with primary and/or secondary antioxidants for the stabilization of thermoplastic plastic recyclates.

It was surprisingly found in accordance with the invention that a very effective stabilization of thermoplastic plastic recyclates against oxidative, thermal, and/or actinic degradation can be achieved by the introduction of at least one substituted sugar alone or together with at least one primary and/or at least one secondary antioxidant. Substituted sugars are additionally very environmentally friendly and inexpensive compounds. Thermoplastic plastic recyclates can thus be stabilized against oxidative, thermal, and/or actinic degradation by the method in accordance with the invention in a very effective, environmentally friendly, and inexpensive manner.

The inventors surmise here that the substituted sugars incorporated into the plastic recyclate can here react with the already present damage sites (as a rule carbonyl groups) to form hemiacetals or full acetals when processing the new compounding. The damage sites in the plastic are thus effectively masked and are no longer available as initiator sites for a further degradation. Damage points in plastic recyclates can thus be eliminated by the method in accordance with the invention or by the additive compositions in accordance with the invention. It is further presumed that the substituted sugars in accordance with the invention can act as hydroperoxide decomposers and/or as metal deactivators.

For this reason, the addition of a substituted sugar to a plastic recyclate is also alone an effective stabilizer since it can frequently be assumed that primary and secondary antioxidants present from the first application in the recyclate had not been completely consumed during the use.

The thermoplastic plastic recyclate used in the method in accordance with the invention is preferably a polyolefin recyclate, e.g. a polypropylene recyclate or a polyethylene recyclate. The method in accordance with the invention is furthermore particularly suitable for the stabilization of pre-damaged recyclates, in particular polyolefin recyclates, whose carbonyl group content, determined by absorption in the infrared spectrum, amounts to at least 0.01 mol/kg, is preferably greater than 0.02 mol/kg, and is particularly preferably greater than 0.05 mol/kg.

In a preferred variant of the method in accordance with the invention, the at least one primary antioxidant is selected from the group consisting of phenolic antioxidants, amines, lactones, and mixtures thereof.

There can, for example, be used as phenolic antioxidants:
Alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butyl-phenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof;
- alkylthio methylphenols such as 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;
- hydroquinones and alkylated hydroquinones, such as 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxylphenyl) adi-pate;
- tocopherols such as α-, β-, γ-, δ-tocopherols and mixtures thereof (vitamin E);
- hydroxylated thiodiphenyl ethers such as 2,2'-thiobis(6-tert-butyl-4-methyl-phenol), 2,2'-thiobis(4-octylphenol), 4,4'-thiobis(6-tert-butyl-3-methyl-phenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;
- alkylidene bispphenols such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexphenol], 2,2'-methylenebis(4-methyl-6-cyclhexylphenol), 2,2'-methylenebis(6-nonyl-4-methylphenol), 2,2'-methylenebis(4,6-di-tert-butyl-phenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]-terephthalate, 1,1-bis-(3,5-dimethyl-2-hydroxyphenyl) butane, 2,2-bis(3,5-di-tert-butyl-4-hydroxyphenyl) propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl) pentane O—, N- and S-benzyl compounds such as 3,5,3',5'-tetra-tert-butyl-4,4'-dihydroxydibenzylether, octadecyl-4-hydroxy-3,5-dimethylbenzylmercapto acetate, tridecyl-4-hydroxy-3,5-di-tert-butylbenzylmercapto acetate, tris (3,5-di-tert-butyl-4-hydroxybenzyl)amine, bis(4-tert-butyl-3-hydroxy-2,6-dimethyl-benzyl)dithiorepthalate, bis(3,5-di-tert-butyl-4-hydroxybenzyl)sulfide, iso-octyl-3,5-di-tert-butyl-4-hydroxybenzylmercaptoacetate;
- hydroxybenzylated malonates such as dioctadecyl-2,2-bis (3,5-di-tert-butyl-2-hydroxybenzyl) malonate, dioctadecyl-2-(3-tert-butyl-4-hydroxy-5-methyl-benzyl) malonate, didodecylmercaptoethyl-2,2-bis(3,5-di-tert-butyl-4-hydroxy-benzyl) malonate, bis[4-(1,1,3,3-tetramethylbutyl)phenyl]--2,2-bis(3,5-di-tert-butyl-4-hydroxybenzyl) malonate;
- aromatic hydroxybenzyl compounds such as 1,3,5-tris(3,5-di-tert-butyl-4-hydroxybenzyl)-2,4,6-trimethylbenzol, 1,4-bis(3,5-di-tert-butyl-4-hydroxy-benzyl)-2,3,5,6-tetramethylbenzol, 2,4,6-tris(3,5-di-tert-butyl-4-hydroxy-benzyl)phenol;
- triazine compounds such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxphenylethyl)--triazine, 1,3,5-tris(3,5-di-tert-butyl-4-hydroyphenylpropionyl) hexahydro--1,3,5-triazine, 1,3,5-tris(3,5-dicyclohexyl-4-hydroxybenzyl) isocyanurate;
- benzylphosphonates such as dimethyl-2,5-di-tert-butyl-4-hydroxybenzyl-phosphonate, dietyhl-3,5-di-tert-butyl-4-hydroxybenzylphosphonate, diocta-decyl-3,5-di-tert-butyl-4-hydroxybenzylphosphonate, dioctadecyl-5-tert-butyl-4-hydroxy-3-methylbenzylphosphonate, the calcium salt of the monoethylester of the 3,5-di-tert-butyl-4-hydroxybenzyl phosphonic acid;
- acylaminophenols such as 4-hydroxylauranilide, 4-hydroxystearanilide, octyl-N-(3,5-di-tert-butyl-4-hydroxyphenyl) carbamate;
- esters of β-(3,5-di-tert-butyl-4-hydroxyphenyl) propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane;
- esters of the β-(5-tert-butyl-4-hydroxy-3-methylphenyl) propionic acid with monovalent or polyvalent alcohols such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl) oxamide, 3-thiaundecanol, 3-thiapentadecanol, trimethylhexanediol, trimethylolpropane, 4-hydroxymethyl-1-phospha-2,6,7-trioxabicyclo [2.2.2]octane, 3,9-bis[2-{3-(3-tert-butyl-4-hydroxy-5-methylphenyl) propionyloxy}-1,1-dimethylethyl]-2.4,-2,4,8,10-tetra-oxaspiro[5.5]undecane; esters of the β-(3,5-dicyclohexyl-4-hydroxyphenyl) propionic acid with monovalent or polyvalent alcohols such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6, 7-trioxabicyclo[2.2.2]octane;

esters of the (3,5-di-tert-butyl-4-hydroxyphenyl acetic acid with monovalent or polyvalent alcohols, e.g. methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; amides of the β-(3,5-di-tert-butyl-4-hydroxyphenyl) propionic acid such as N,N'-bis(3,5-di-tert-butyl-4-hydroxyphenylpropionyl) hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl) hydrazide, N,N'-bis[2-(3-[3, 5-di-tert-butyl-4-hydroxyphenyl]propionyloxy)ethyl] oxamide (Naugard®XL-1, marketed by Addivant);

ascorbic acid (vitamin C).

Particularly preferred phenolic antioxidants are the following structures:

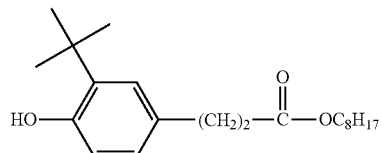

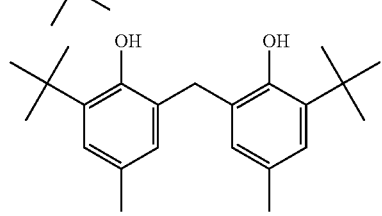

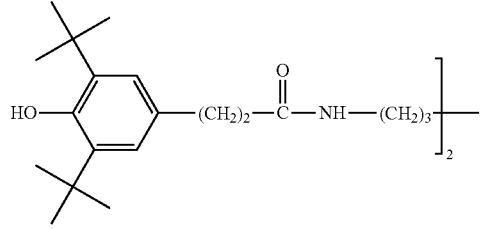

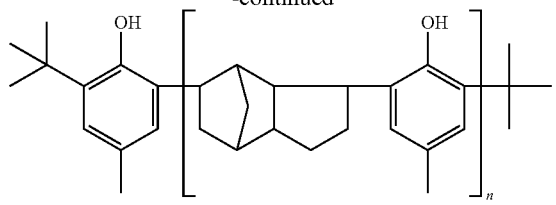

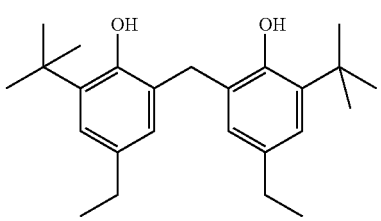

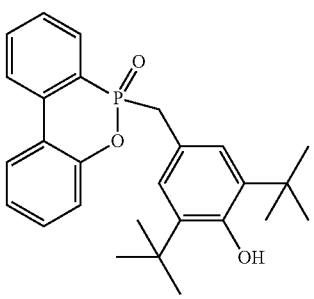

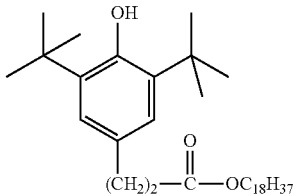

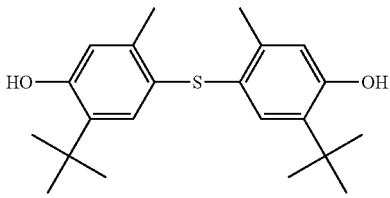

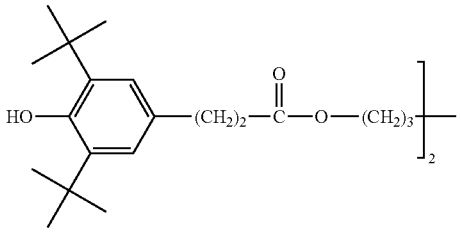

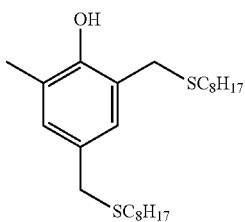

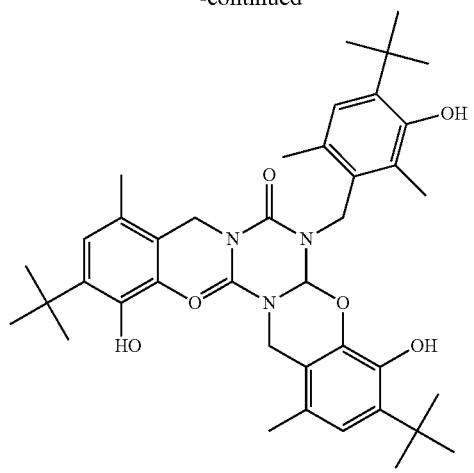
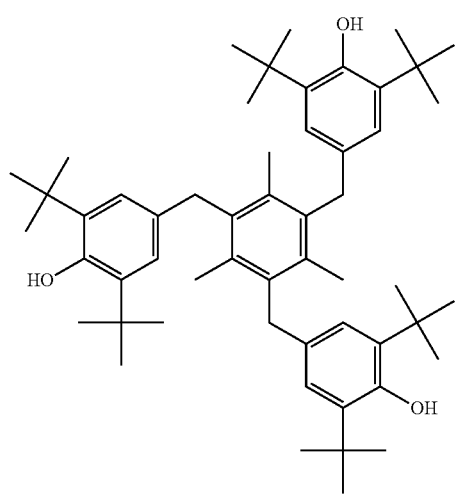
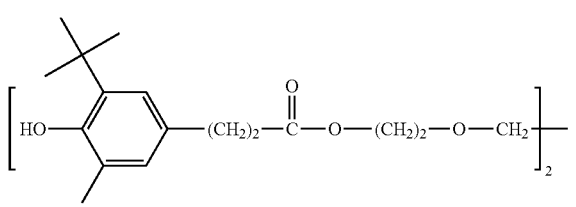
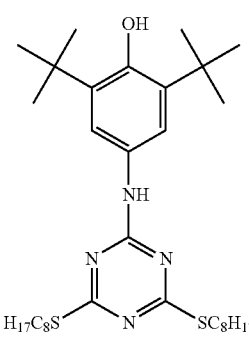
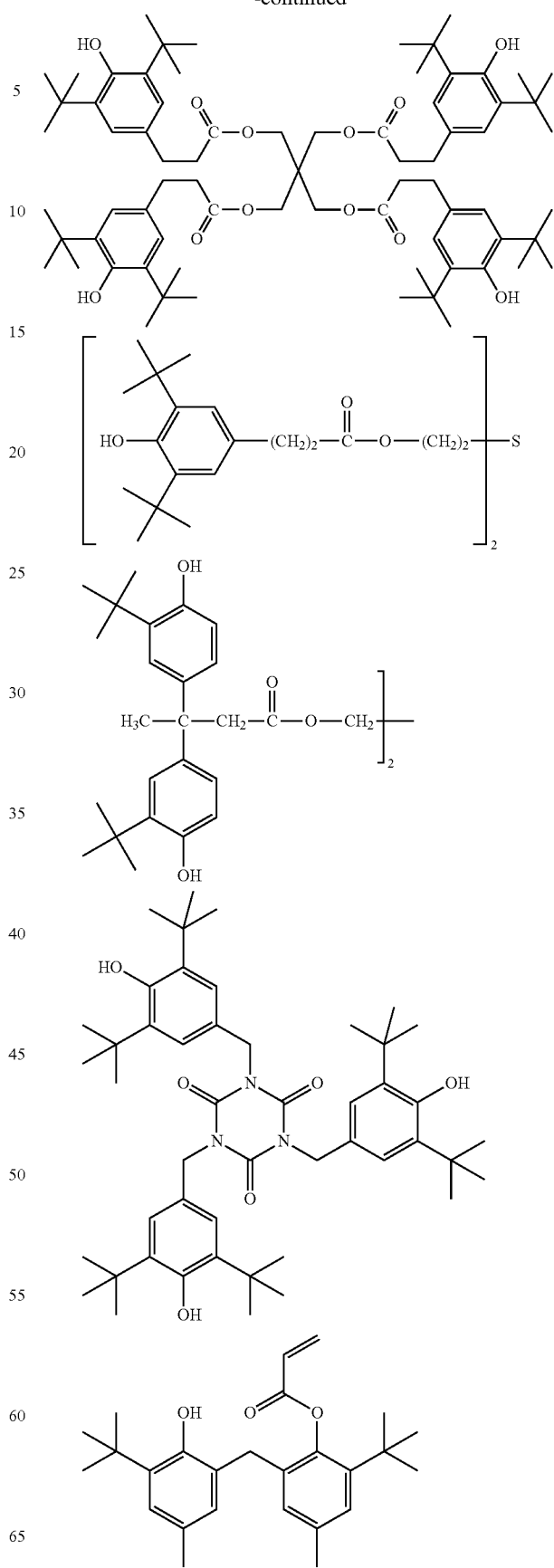

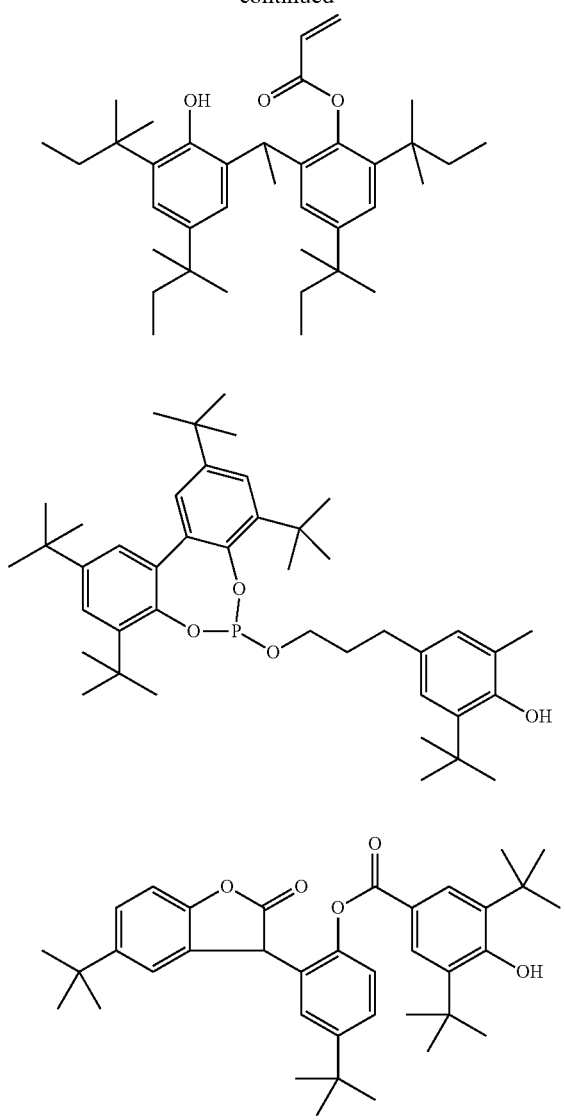

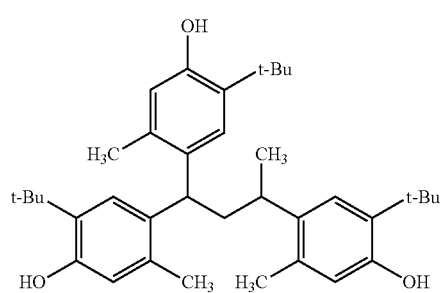

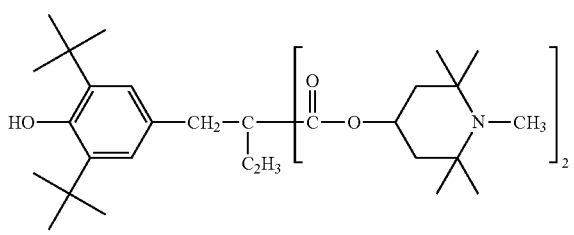

where n in the compounds named above is a whole number and is between 2 and 10.

Very particularly preferred phenolic antioxidants are octadecyl-3-(3,5-di-tert-butyl-4-hydroxyphenyl) propionate and pentaerythritol tetrakis(3-(3,5-di-tert-butyl-4-hydroxyphenyl) propionate).

Further preferred phenolic antioxidants are phenolic antioxidants based on sustainable raw materials such as tocopherols (vitamin E), tocotrienols, tocomonoenols, ubichinols, hydroxytyrosol, flavanoids and flavanols such as chrysin, quercetin, hesperidin, neohesperidin, naningin, morin, kaempferol, fisein, datiscetin, luteolin, apigenin, taxifolin, isoflavones such ss genistein, genistin, daidzein, daidzin, formononetin, anthocyanes such as delphinidin and malvidin, curcumin, carnosoic acid, carnosol, rosemarinic acid, tannin and resveratrol, and carotenoids having alcoholic groups such as beta-cryptoxanthin, lutein, zeaxanthin, or astaxanthin.

There can, for example, be used as aminic antioxidants: N,N'-di-isopropyl-p-phenylenediamine, N,N'-di-sec-butyl-p-phenylendiamine, N,N'-bis(1,4-dimethylpentyl)-p- phenylenediamine, N,N'-bis(1-ethyl-3-methyl-pentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylene-diamine, N-(1-methylheptyl)-N'-phenyl-p-phenylenediamine, N-cyclohexyl-N'-phenyl-p-phenylenediamine, 4-(p-toluol-sulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxy-phenyl)amine, 2,6-di-tert-butyl-4-dimethylaminomethyl-phenol, 2,4'-di-aminodiphenyl methane, 4,4'-diaminodiphenyl methane, N,N,N',N'-tetra-methyl-4,4'-diaminodiphenylmethane, 1,2-bis[(2-methyl-phenyl)amino]ethane, 1,2-bis(phenylamino) propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono-und dialkylated isopropyl/Isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetra-phenyl-1,4-diaminobut-2-ene and mixtures or combinations thereof.

Preferred Aminic Antioxidants are:
N,N'-di-isopropyl-p-phenylenediamine, N,N'-di-sec-butyl-p-phenylenediamine, N,N'-bis(1,4-dimethylpentyl)-p-phenylenediamine, N,N'-bis(i-ethyl-3-methyl-pentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine. Particularly preferred phenolic antioxidants are the following structures:

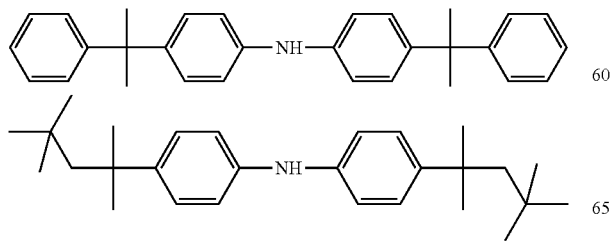

-continued

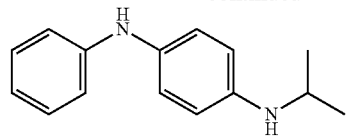

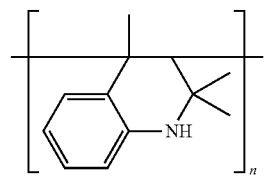

where n is a whole number and is between 3 and 100.

Further preferred aminic antioxidants are:

Hydroxylamines or N-oxides (nitrones) such as N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and Genox EP (marketed by the SI Group) in accordance with the formula:

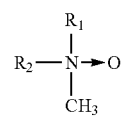

$R_1, R_2 = C_{14}\text{-}C_{24}$ alkyl chains

Preferred lactones are:

Benzofuranones and indolinones such as 3-(4-(2-acetoxy-ethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-(2-hydroxyethoxy]phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one as well as lactones that additionally contain a phosphite group such as 19 20
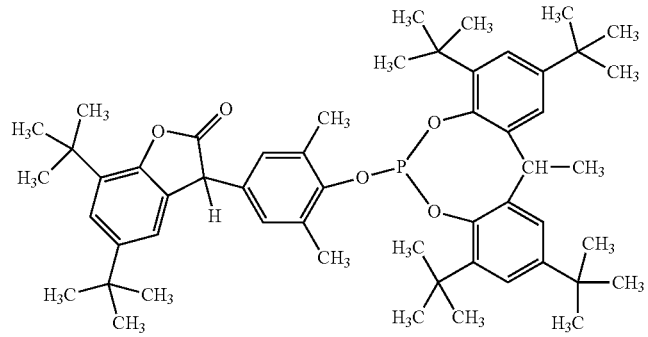
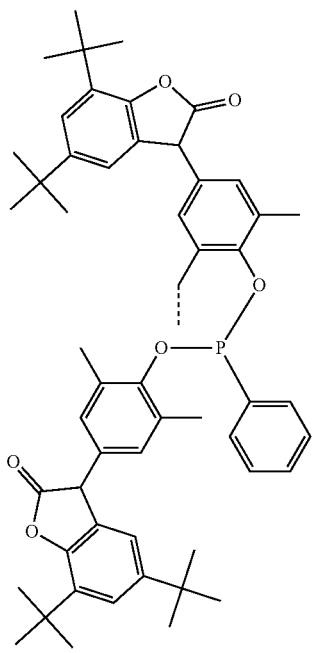
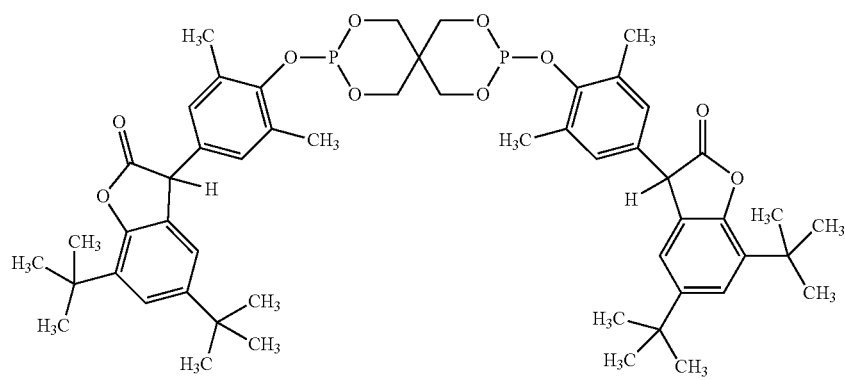

A further suitable group of antioxidants are isoindolol[2,1-A]quinazolines such as

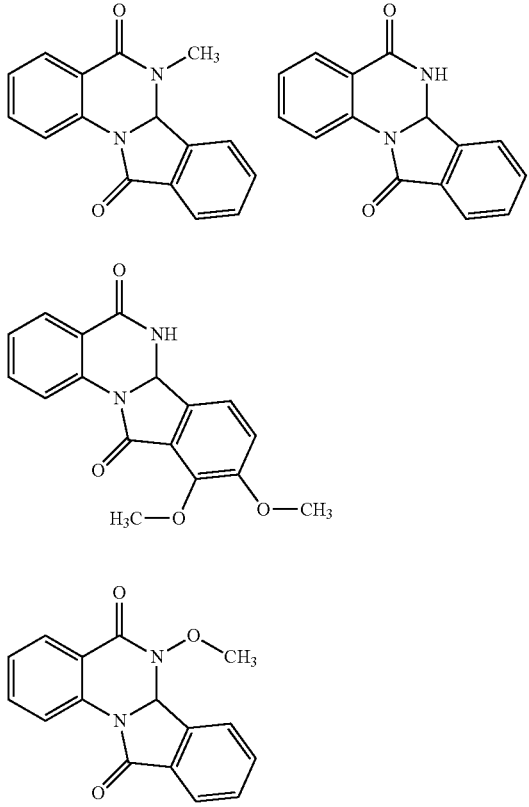

A further preferred variant of the method in accordance with the invention is characterized in that the at least one secondary antioxidant is selected from the group consisting of phosphorus compounds, in particular phosphites and phosphonites, organo-sulfur compounds, in particular sulfides and disulfides, and mixtures thereof.

Suitable secondary antioxidants are in particular phosphites or phosphonites such as triphenylphosphite, diphenylalkylphosphites, phenyldialkylphosphites, tri (nonylphenyl) phosphite, trilaurylphosphites, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl) pentaerythritoldiphosphite, bis(2,4-di-cumylphenyl) pentaerythritoldiphosphite, bis(2,6-di-tert-butyl-4-methylphenyl)-pentaerythritoldip- hosphite, diisodecyloxy-pentaerythritoldiphosphite, bis(2,4-di-tert-butyl-6-methylphenyl) pentaerythritoldiphosphite, bis(2,4,6-tris(tert-butylphenyl) penta-erythritoldiphosphite, tristearylsorbitoltriphosphite, tetrakis(2,4-di-tert-butylphenyl)-4,4'-biphenylendiphosphonite, 6-isooctyloxy-2,4,8, 10-tetra-tert-butyl-12H-dibenz[d,g]-1,3,2-dioxaphosphocin, bis(2,4-di-tert-butyl-6-methylphenyl)methylphosphite, bis(2,4-di-tert-butyl-6-methyl-phenyl)-ethylphosphite, 6-flu- oro-2,4,8,10-tetra-tert-butyl-12-methyl-dibenz-[d,g]-,2-1, 3dioxaphosphocin, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butyl-phenoxy)-1,3,2-dioxaphosphirane.

Particularly preferred phosphites/phosphonites are:

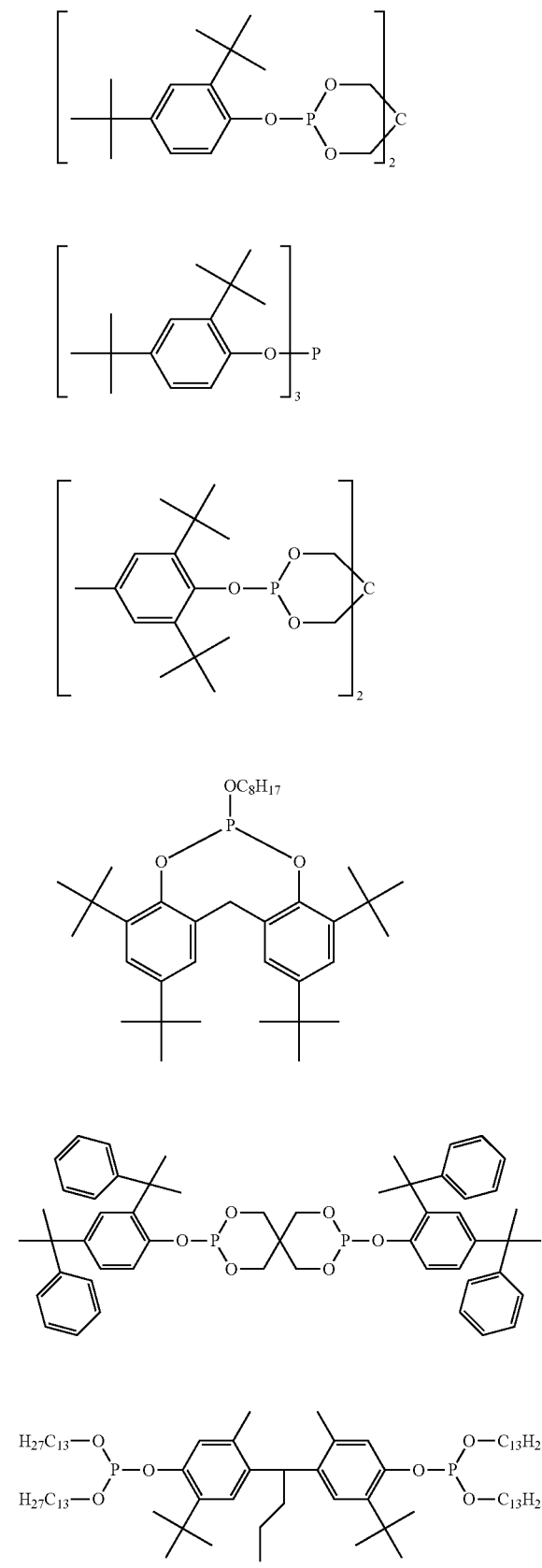

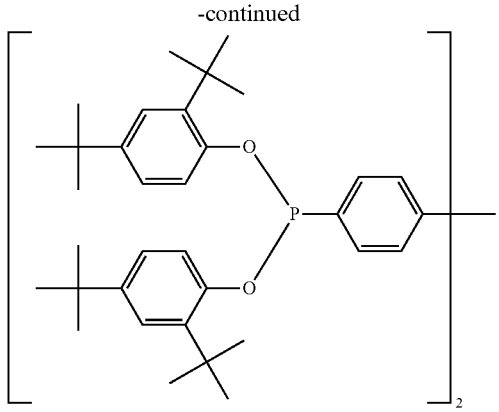
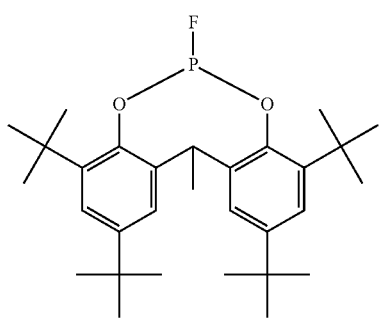
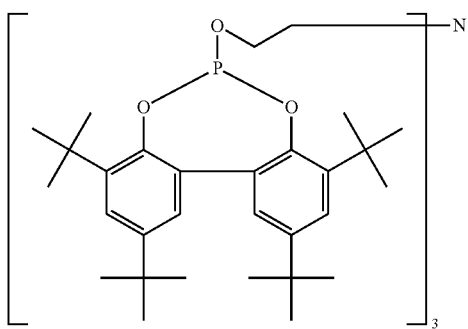
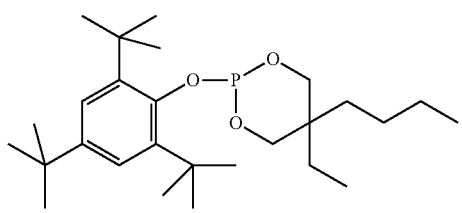
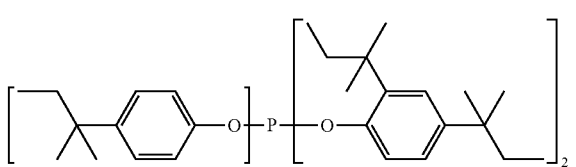
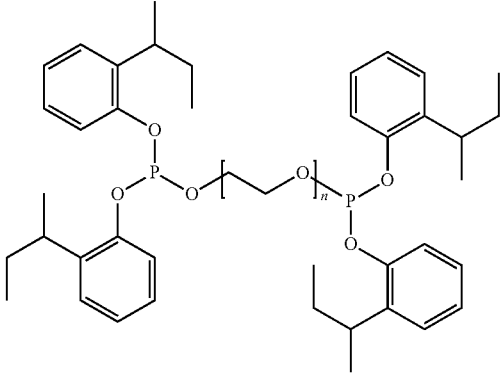
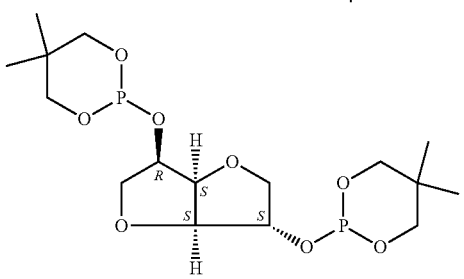
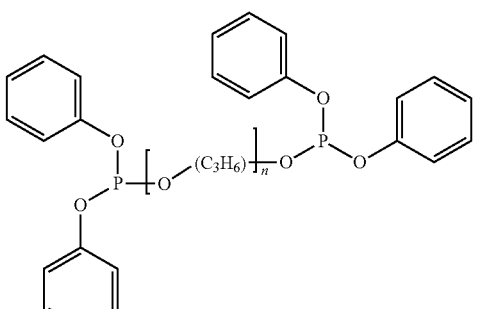
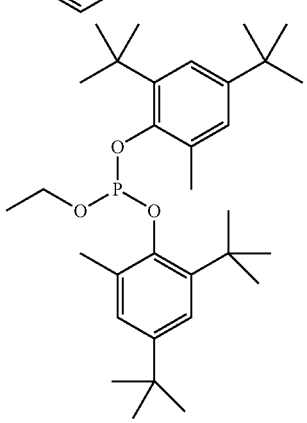
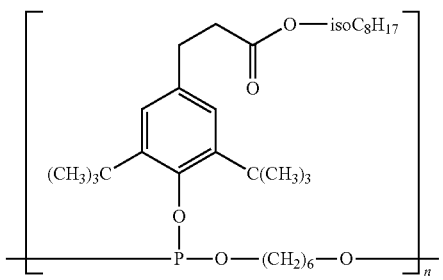
where n=3-100.

A preferred phosphonite is:

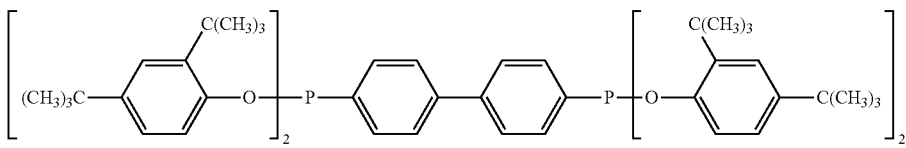

The phosphite tris-(2,4-di-tert-butylphenyl)phosphite is very particularly preferably used as the secondary antioxidant.

Suitable secondary antioxidants are furthermore organosulfur compounds such as sulfides and disulfides, e.g. distearylthiodipropionate, dilaurylthiodipropionate; ditridecyldithiopropionate, ditetradecylthiodipropionate, 3-(dodecylthio)-,1,1'-[2,2-bis[[3-(dodecylthio)-1-oxopropoxy]methyl]-1,3-propandiyl]propanoic acid ester. The following structures are preferred:

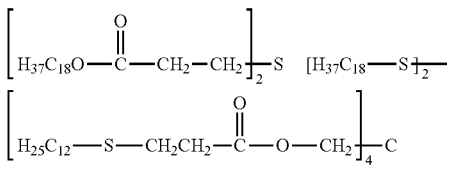

In a further preferred embodiment, component (B) comprises both a primary antioxidant and a secondary antioxidant. It is particularly preferred in this case that component (B) comprises a phenolic antioxidant and a phosphite or phosphonite.

In a further preferred embodiment, components (A) and (B) comprise a sustainable raw material.

A particularly preferred variant of the method in accordance with the invention is characterized in that at least one primary antioxidant and at least one secondary antioxidant are introduced into the thermoplastic. This means that at least one primary antioxidant and at least one secondary antioxidant are used as component (B). In this manner, an even more effective stabilization of the thermoplastic against oxidative, thermal, and/or actinic degradation can be achieved.

In a further preferred variant of the method in accordance with the invention, component (A) and component (B) are introduced into the thermoplastic plastic recyclate in a weight ratio of 5:95 to 95:5, preferably of 10:90 to 90:10, particularly preferably of 20:80 to 80:20.

If component (B) comprises both a primary antioxidant and a secondary antioxidant, the ratio between the primary antioxidant and the secondary antioxidant is preferably 90:10 to 10:90, particularly preferably 80:20 to 20:80, and very particularly preferably 70:30 to 30:70.

A further preferred variant of the method in accordance with the invention is characterized in that components (A) and (B) are introduced into the thermoplastic plastic recyclate in that
  components (A) and/or (B) present as solids are mixed with the thermoplastic plastic recyclate present as a solid and the mixture thereby produced is melted and subsequently cooled; or
  components (A) and/or (B) present as solids are melted and the melt thereby produced is introduced into a melt of the thermoplastic plastic recyclate.

Components (A) and (B), that can be present as a powder, compacted, as pellets, a solution, or flakes, are preferably mixed with the polymer to be stabilized, the polymer matrix is transferred into the melt and is subsequently cooled. Alternatively to this, it is equally possible to introduce the additive into a polymer melt in a molten state.

For the case that further components are added to the thermoplastic plastic recyclate, they can be admixed to the polymers separately, in the form of liquids, powders, pellets, or compacted products, or together with the additive composition in accordance with the invention as described above.

At least one additive can preferably additionally be introduced into the thermoplastic plastic recyclate that is selected from the group consisting of UV absorbers, light stabilizers, metal deactivators, filler deactivators, antiozonants, nucleation agents, anti-nucleation agents, impact strength enhancers, plasticizers, lubricants, rheology modifiers, thixotropic agents, chain extenders, optical brighteners, antimicrobial active agents, antistatic agents, slip agents, anti-blocking means, coupling agents, crosslinking agents, anti-crosslinking agents, hydrophilization agents, hydrophobing agents, bonding agents, dispersing agents, compatibilizers, oxygen scavengers, acid scavengers, expanding agents, degradation additives, defoaming agents, odor scavengers, marking agents, anti-fogging agents, fillers, reinforcement agents, and mixtures thereof.

It is further preferred that at least one additive is additionally introduced into the thermoplastic plastic recyclate that is selected from the group consisting of
  a) acid scavengers, light stabilizers, preferably light stabilizers from the group of hindered amines,
  b) dispersing agents,
  c) filler deactivators, and mixtures thereof.

Suitable acid scavengers ("antacids") are salts of monovalent, bivalent, trivalent, or quadrivalent metals, preferably alkali metals, alkaline earth metals, aluminum or zinc, in particular formed with fatty acids such as calcium stearate, magnesium stearate, zinc stearate, aluminum stearate, calcium laurate, calcium behenate, calcium lactate, calcium stearolyl-2-lactate. Further classes of suitable acid scavengers are hydrolactites, in particular synthetic hydrolactites on the basis of aluminum, magnesium and zinc, hydrocalumites, zeolites, alkaline earth oxides, in particular calcium oxide and magnesium oxide and zinc oxide, alkaline earth carbonates, in particular calcium carbonate, magnesium carbonate, dolomite, and hydroxides, in particular brucite (magnesium hydroxide).

Suitable light stabilizers are, for example, compounds based on 2-(2'-hydroxyphenyl)benzotriazoles, 2-hydroxy benzophenones, esters of benzoic acids, acrylates, oxamides, and 2-(2-hydroxyphenyl)-1,3,5-triazines.

Suitable 2-(2'-hydroxyphenyl)benzotriazoles are, for example, 2-(2'-hydroxy-5'-methylphenyl)benzotriazole, 2-(3',5'-di-tert-butyl-2'-hydroxy-phenyl)-benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorbenzotriazole, 2-(3'-tert-butyl-2'-hydroxy-5'-methylphenyl-5-chlorbenzotriazole, 2-(31-sec-butyl-5'-tert-butyl-2'-hydroxy-phenyl)benzotriazole, 2-(2'-hydroxy-4'-octyloxyphenyl)benzotriazole, 2-(31,5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxy-carbonylethyl)phenyl)-5-chlorbenzotriazole, 2-(3'-tert-butyl-5'-[2-(2-ethyl-hexyloxy) carbonylethyl]-2'-hydroxyphenyl)-5-chlorbenzotriazole, 2-(3 '-tert-butyl-2'-hydroxy-5'-(2-methoxycarbonylethyl)phenyl)-5-chlorbenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3 '-tert-butyl-2'-hydroxy-5'-(2-isooctyloxycarbonylethyl)phenylbenzotriazole, 2,2'-methylenebis[4-(1, 1,3,3-tetramethylbutyl)-6-benzotriazol-2-ylphenol]; the product of the transesterification of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]-2, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole, 2-[2'-hydroxy-3'-(1,1,3,3-tetramethylbutyl)-5'-(α,α-dimethylbenzyl)phenyl]benzotriazole.

Suitable 2-hydroxybenzophenones are, for example, 4-hydroxy-, 4-methoxy-, 4-octyloxy-, 4-decyloxy-4-dodecyloxy, 4-benzyloxy, 2',4'-trihydroxy- and 2'-hydroxy-4,4'-dimethyoxy derivatives of the 2-hydroxy benzophenones.

Suitable acrylates are, for example, ethyl-α-cyano-β, β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N—(β-carbomethoxy-β-cyanovinyl)-2-methylindoline.

Suitable esters of benzoic acid are, for example 4-tert-butylphenyl salicylate, phenylsalicylate, octylphenylsalicylate, dibenzoyl resorcinol, bis(4-tert-butylbenzoyl) resorcinol, benzoyl resorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4, 6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy-/tridecyloxy-2-hydroxy-propoxy)-2-hydroxyphenyl]-4,6-bis(2,4-dimethylphenyl)-1, 3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylale-N'-salicyloylhydrazine, N,N'-bis(salicyloyl) hydrazine, N,N'-bis(3,5-di-tert-butyl-4-hydroxyphenylpropionyl) hydrazine, 3-salicyloylamino--triazole, bis(benzylidene) oxalyldihydrazide, oxanilide, isophthaloyldihydrazide, sebacoyl-bis-phenylhydrazide, N,N'-diacetyladipoyldihydrazide, N,N'-bis(salicyloyl)-oxylyldihydrazide, N,N'-bis(salicyloyl)thiopropionyldihydrazide.

Particularly preferred as metal deactivators are

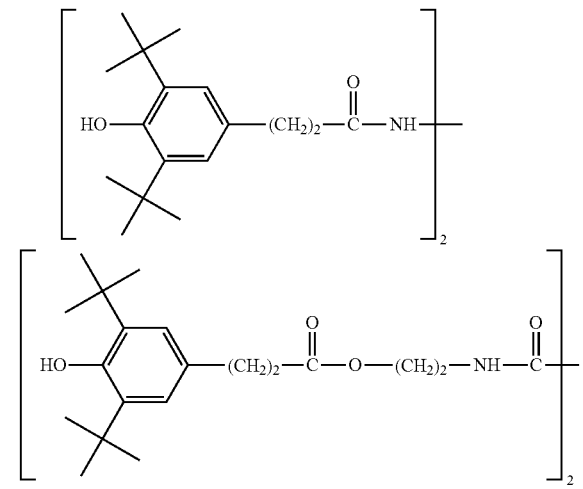

Suitable hindered amines are, for example, 1,1-bis(2,2,6,6-tetramethyl-4-piperidyl)succinate, bis(1,2,2,6,6-pentamethyl-4-piperidyl)sebazate, bis(1-octyloxy-2,2,6,6-tetramethyl-4-piperidyl)sebazate, bis(1, 2,2,6, 6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxy-piperidine und succinic acid, linear or cyclic condensation products of N,N'-bis(2,2,6,6-tetramethyl-4-piperidyl) hexamethylenediamine and 4-tert-octylamino-2,6-di-chloro-1,3,5-triazine, tris(2,2,6,6-tetramethyl-4-piperidyl) nitrilotriacetate, tetrakis(2,2,6,6-tetra-methyl-4-piperidyl)-1,2,3,4-butantetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl) hexamethylenediamine and 4-morpholino-2,6-dichloro-1,3,5-triazine, the reaction product of 7, 7, 9, 9-tetramethyl-2-cycloundecyl-1-oxa-3,8-diaza-4-oxospiro-[4,5]decane and epichlorohydrin.

The sterically hindered N—H, N-alkyl such as N-methyl or N-octyl, the N-alkoxy derivatives such as N-methoxy or N-octyloxy, the cycloalkyl derivatives such as N-cyclohexyloxy and the N-(2-hydroxy-2-methylpropoxy) analogs are also each included in the above-given structures here.

Preferred hindered amines furthermore have the following structures:
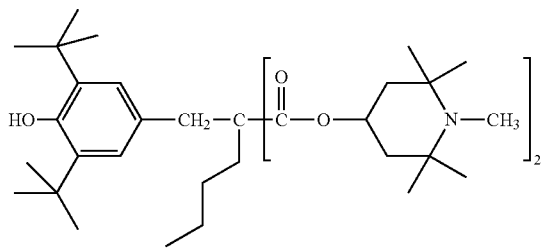
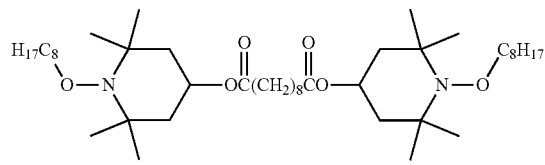
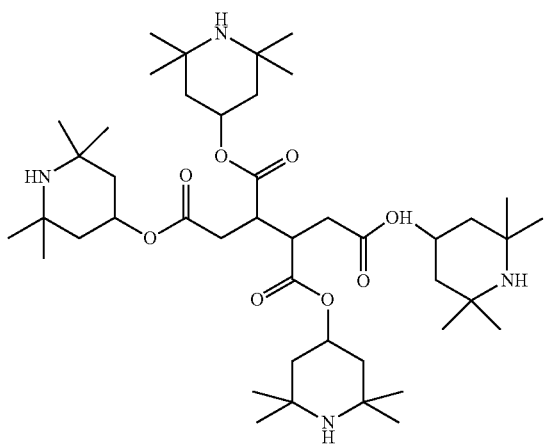
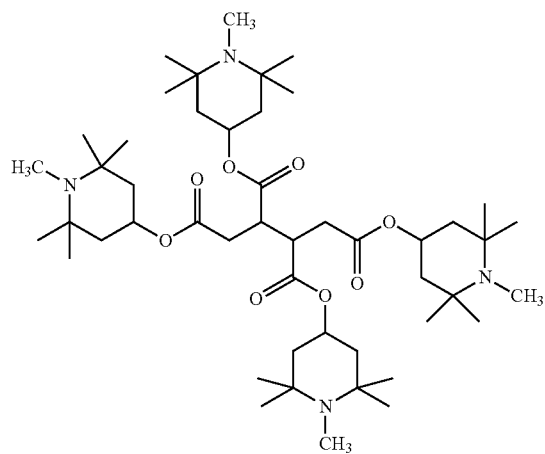
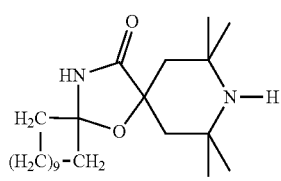
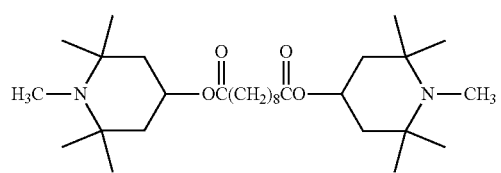
I
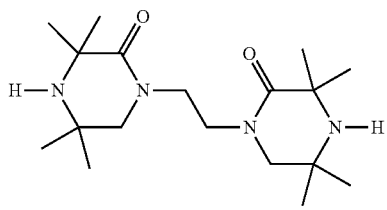
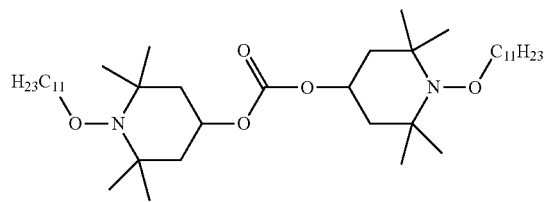
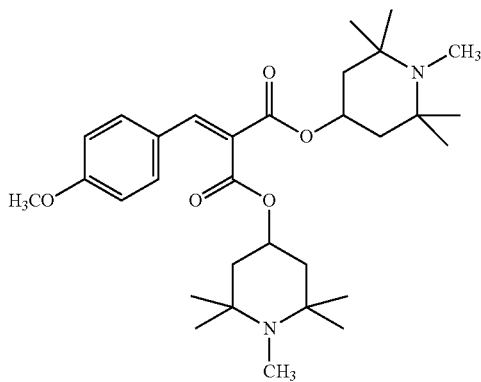

-continued
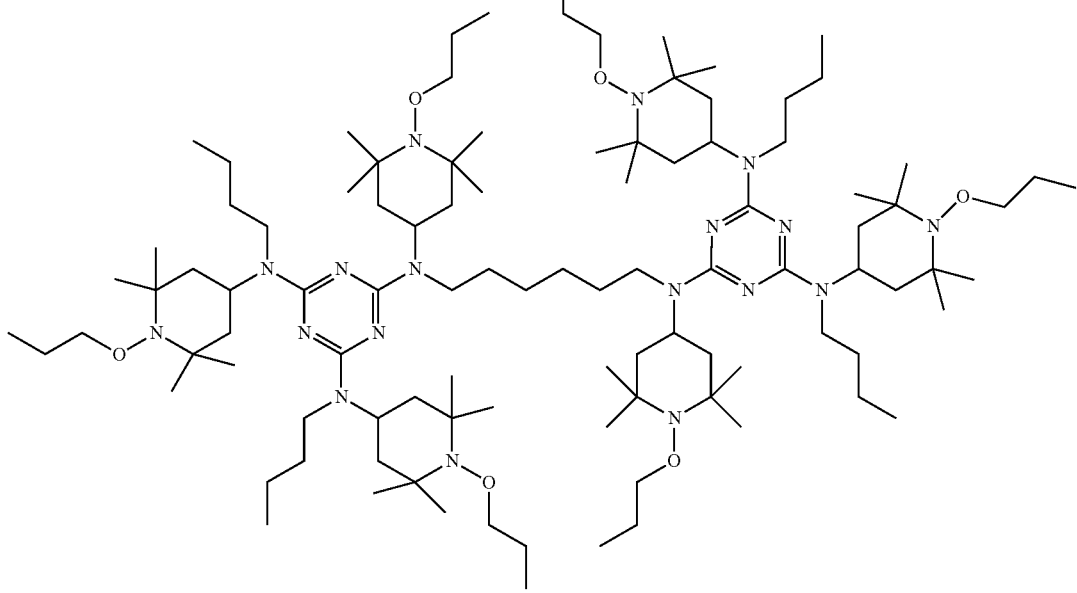
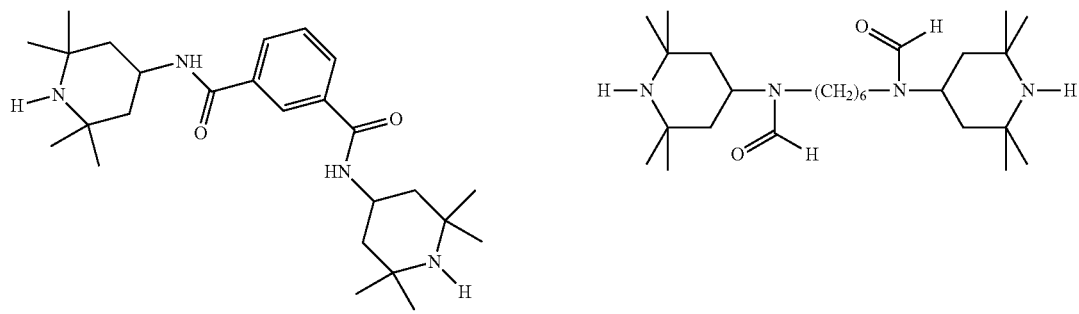
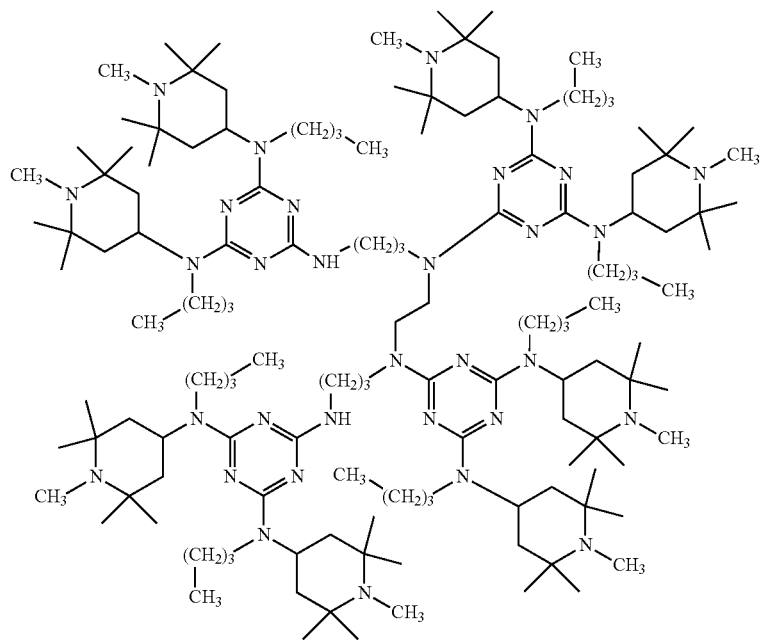

33
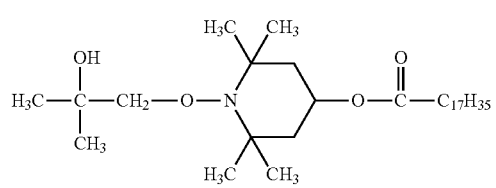
34
-continued
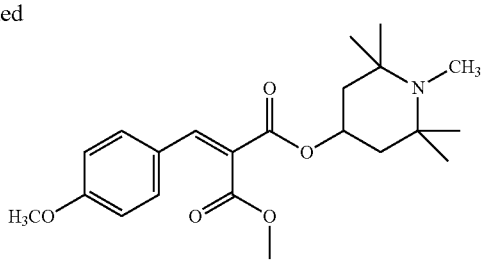
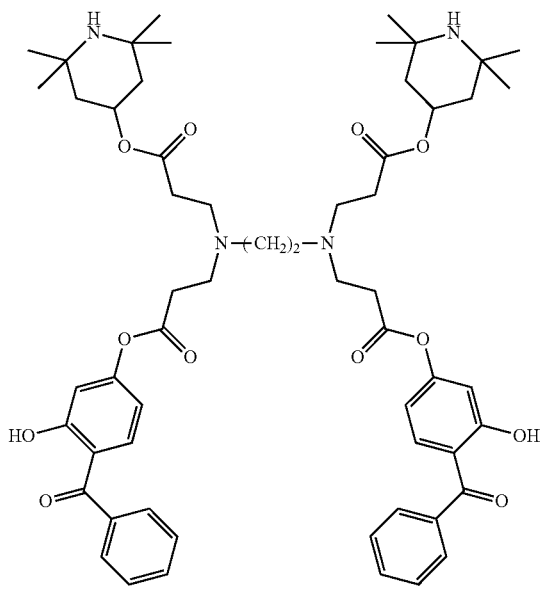
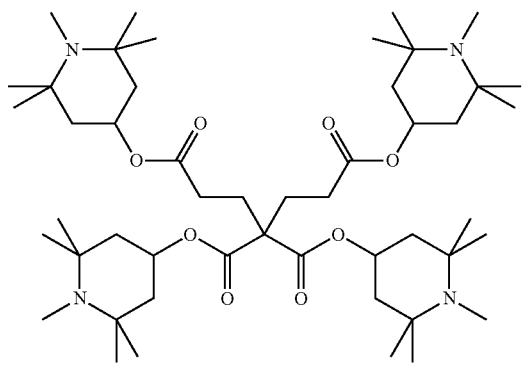
35
Preferred oligomeric and polymeric hindered amines have the following structures:
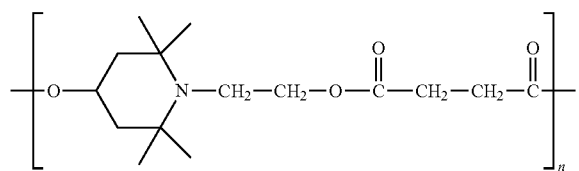
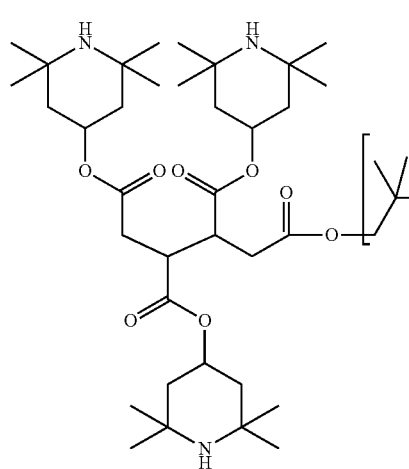
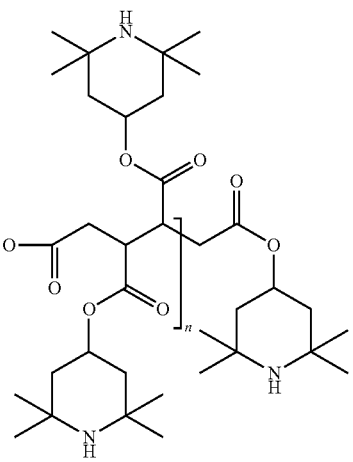

35
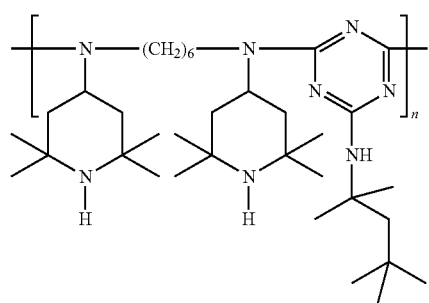
36
-continued
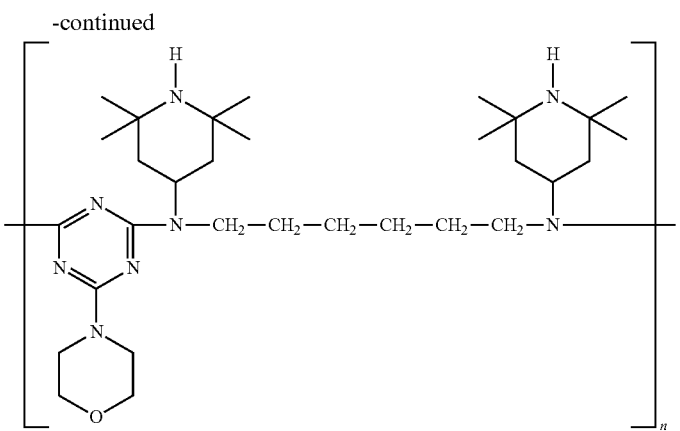
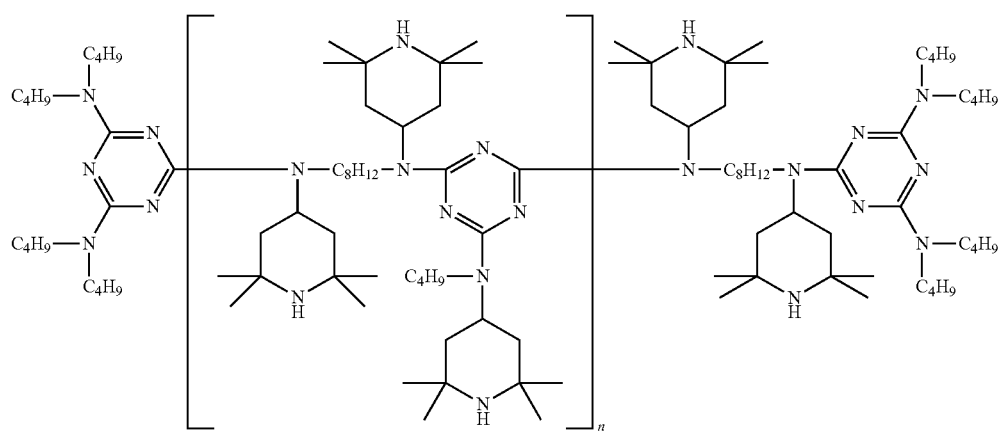
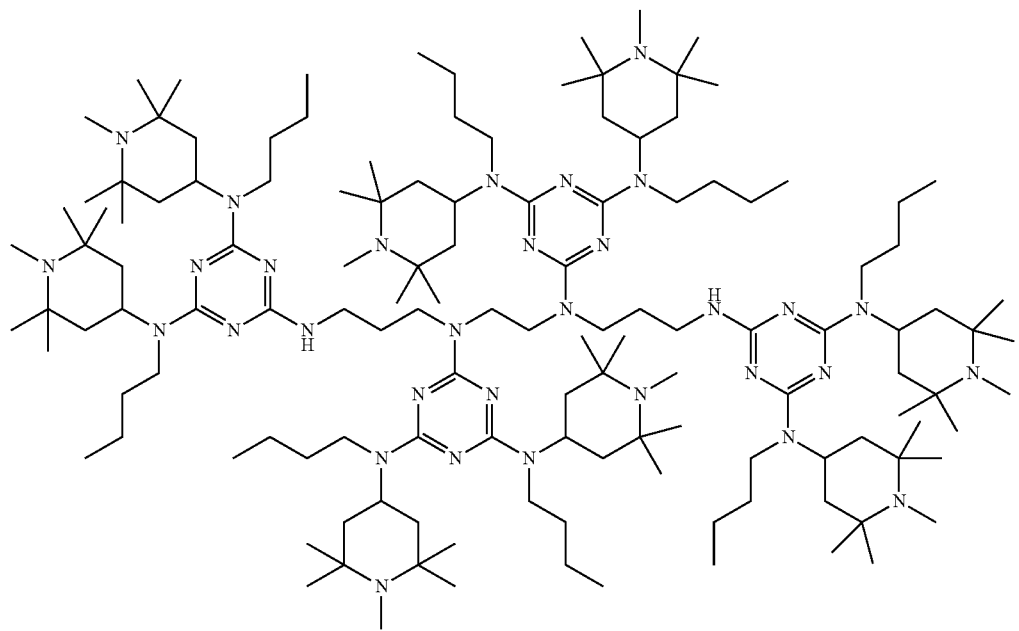

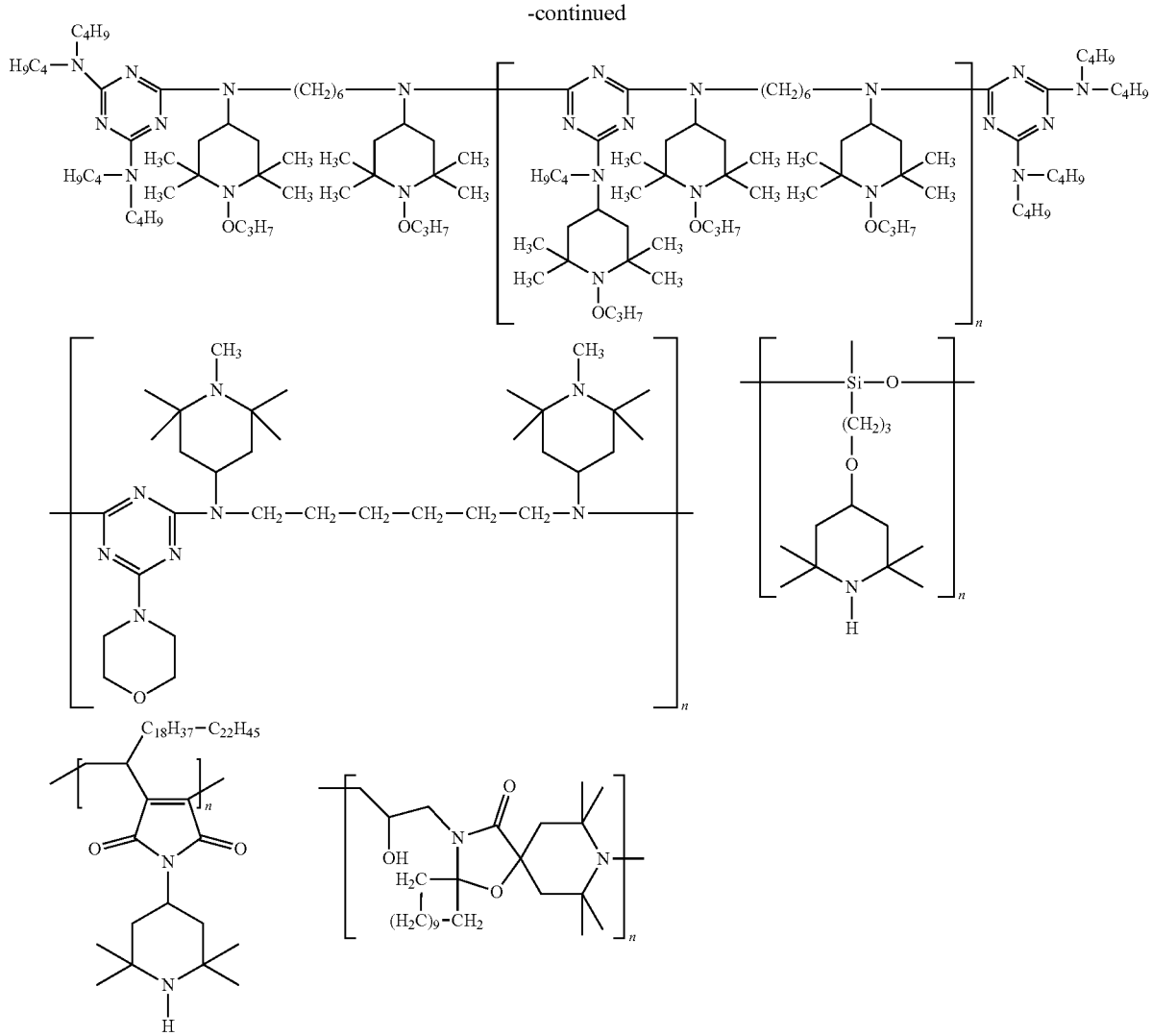

In the above-named compounds, n respectively means 3 to 100.

A further suitable light stabilizer is Hostanox NOW (manufacturer: Clariant SE) having the following general structure:

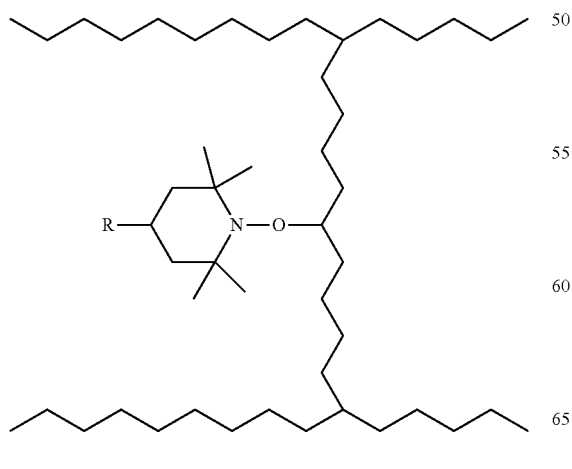

Suitable dispersion agents are, for example:
polyacrylates, e.g. copolymers with long-chain side groups, polyacrylate block copolymers, alkylamides: e.g. N,N'—-1,2-ethanediylbisoctadecanamide sorbitan esters, e.g. monostearylsorbitan esters, titanates and zirconates, reactive copolymers with functional groups, e.g. polypropylene-co-acrylic acid, polypropylene-co-maleic acid anhydride, polyethylene-co-glycidylmethacrylate, polystyrene-alt-maleic acid anhydride polysiloxanes: e.g. dimethylsilanediol-ethylene oxide copolymers, polyphenylsiloxane copolymers, amphiphilic copolymers: e.g. polyethylene block polyethylene oxide, dendrimers, e.g.
dendrimers containing hydroxyl groups.

Suitable antinucleation agents are azine dyes such as nigrosin.

Suitable flame retardant agents are, in particular
a) inorganic flame retardant agents such as $Al(OH)_3$, $Mg(OH)_2$, $AlO(OH)$, $MgCO_3$, sheet silicates such as montmorillonite or sepiolite, non-modified or organically modified double salts such as Mg—Al silicates, POSS (polyhedral oligomeric silsesquioxane) compounds, huntite, hydro magnesite or halloysite and $Sb_2H_3$, $Sb_2H_5$, $MoO_3$, zinc stannate, zinc hydroxystannate, b) flame retardant agents containing nitrogen such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phosphate, and the corresponding pyrophosphates and polyphosphates, poly-[2,4-(piperazine-1,4-yl)-6-(morpholine-4-yl)-triazine], ammonium polyphosphate, melamine borate, melamine hydrobromide, c) radical formers such as alkoxyamines, hydroxylamine esters, azo compounds, triazine compounds, disulfides, polysulfides, thiols, thiuram sulfides, dithiocarbamates, mercaptobenzthiazoles, sulfene amides, sulfene imides, d) dicumyl or polycumyl, hydroxyimides and their derivatives such as hydroxyimide esters or hydroxyimide ethers, e) flame retardant agents containing phosphorus such as red phosphorus, phosphates such as resorcin diphosphite, bisphenol A diphosphate, and their oligomers, triphenylphosphate, ethylene diamine diphosphate, phosphinates such as salts of the hypophosphorous acid and their derivatives such as alkylphosphinate salts, e.g. diethylphosphinate aluminum or diethylphosphinate zinc or aluminum phosphinate, aluminum phosphite, aluminum phosphonate, phosphonate esters, oligomer and polymer derivatives of the methane phosphonic acid, 9,10-dihydro-9-oxa-10-phosphorylphenanthrene-10-oxide (DOPO) and their substituted compounds, f) halogenated flame retardant agents based on chlorine and bromine such as polybrominated diphenyl oxides such as decabromodiphenyloxide, tris(3-bromo-2,2-bis(bromomethyl) propylphosphate, tris(tribromoneopentyl)-phosphate, tetrabromophthalic acid, 1,2-bis(tribromophenoxy) ethane, hexabromocyclododecane, brominated diphenylethane, tris-(2,3-dibrompropyl) isocyanurate, ethylene-bis-(tetrabromophthalimide), tetrabromo-bisphenol A, brominated polystyrene, brominated polybutadiene or polystyrene brominated polybutadiene copolymers, brominated polyphenylene ether, brominated epoxy resin, polypentabromobenzylacrylate, optionally in combination with $Sb_2H_3$ and/or $Sb_2H_5$, g) borates such as zinc borate or calcium borate, optionally on a carrier material such as silica.

h) sulfurous compounds, such as elemental sulfur, disulfides and polysulfides, thiuram sulfide, dithiocarbamates, mercaptobenzothiazole and sulfene amides, i) anti-drip agents, such as polytetrafluoroethylene, j) silicon-containing compounds, such as polyphenyl siloxanes, k) carbon modifications, such as carbon nanotubes (CNTs), expandable graphite or graphene l) and combinations or mixtures thereof.

The following compounds are halogen free and are very particularly preferred flame retardant agents:

$Al(OH)_3$, $Mg(OH)_2$,

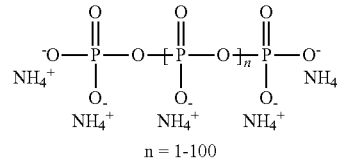

n = 1-100

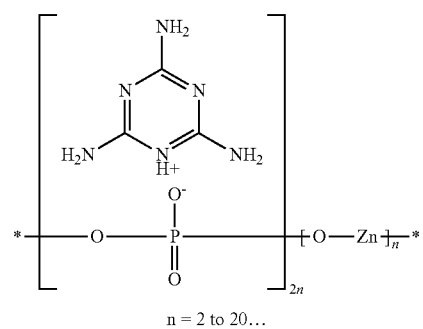

n = 2 to 20...

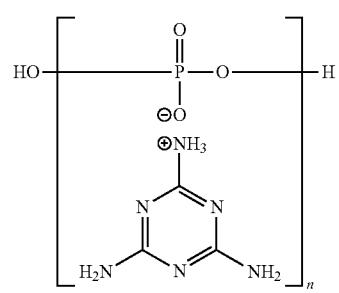

with n = 2 to 20...

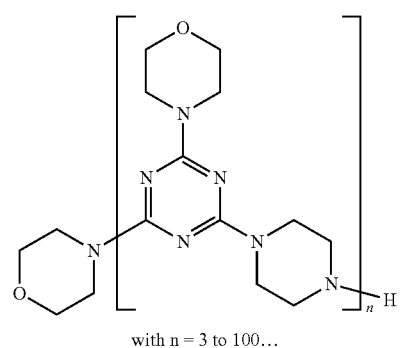

with n = 3 to 100...

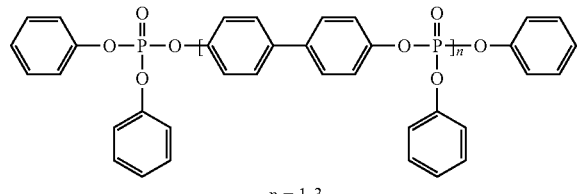

n = 1-3

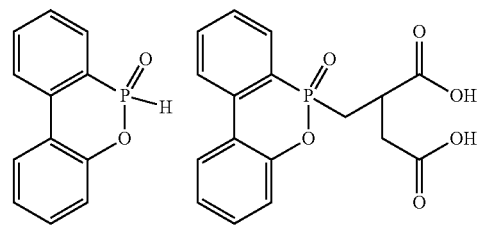

-continued

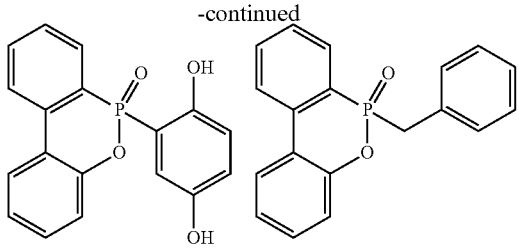

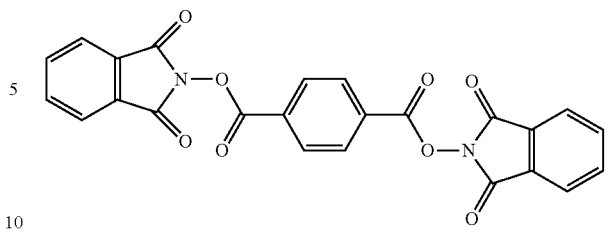

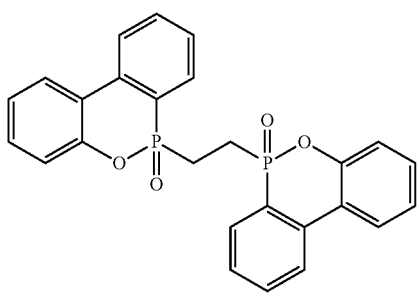

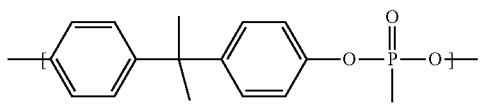

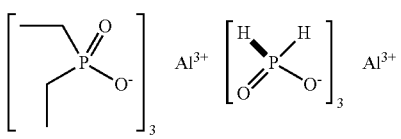

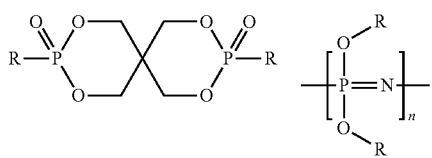

with R=alkyl, phenyl respectively and n=3 to 20

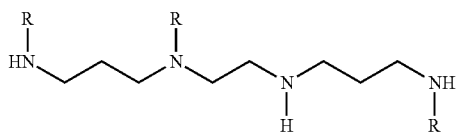

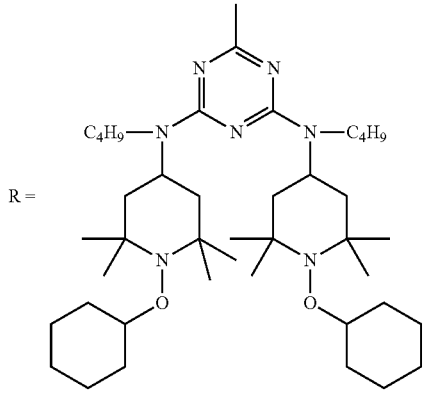

Suitable plasticizers are, for example, phthalic acid esters, adipic acid esters, esters of citric acid, ester of 1,2-cyclohexane dicarboxylic acid, trimellitic acid esters, isorobide esters, phosphate esters, epoxides such as epoxidized soy bean oil, or aliphatic polyesters. Suitable mold lubricants and processing aids are, for example, polyethylene waxes, polypropylene waxes, salts of fatty acids such as calcium stearate, zinc stearate, or salts of montane waxes, amide waxes such as erucic acid amide or oleic acid amides, fluoropolymers, silicones, or neoalkoxytitanates and zirconates.

Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, diketoptyrrolopyrrols, dioxazines, inanthrones, isoindolines, azo compounds, perylenes, phthalocyanines or pyranthrones. Further suitable pigments include effect pigments on a metal basis or pearl gloss pigments on a metal oxide basis.

Suitable optical brighteners are, for example, bis-beznzoxazoles, phenylcumarines, or bis(styryl) biphenyls and in particular optical brighteners of the formulas:

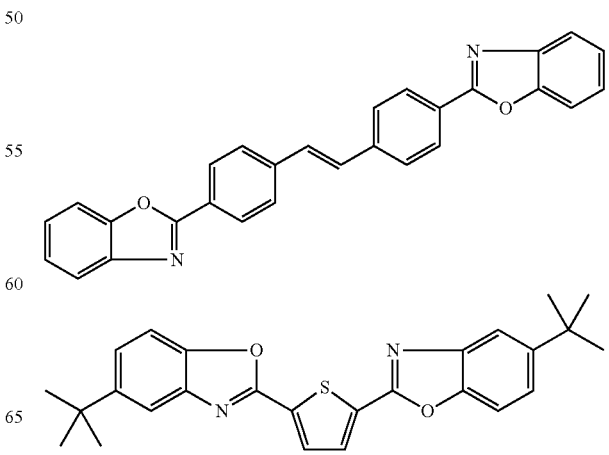

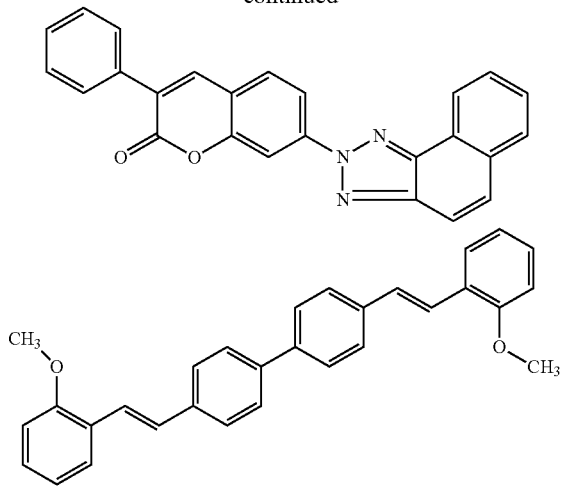
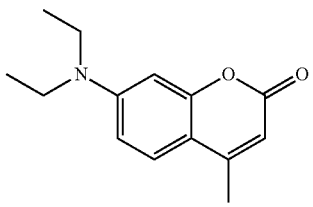
Suitable filler deactivators are, for example, polysiloxanes, polyacrylates, in particular block copolymers such as polymethacrylic acid polyalkylene oxide or polyglycidyl (meth)acrylates and their copolymers, e.g. with styrene and epoxides of e.g. the following structures:
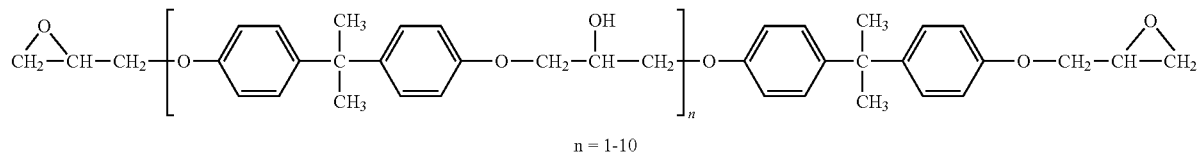
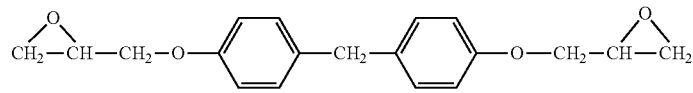
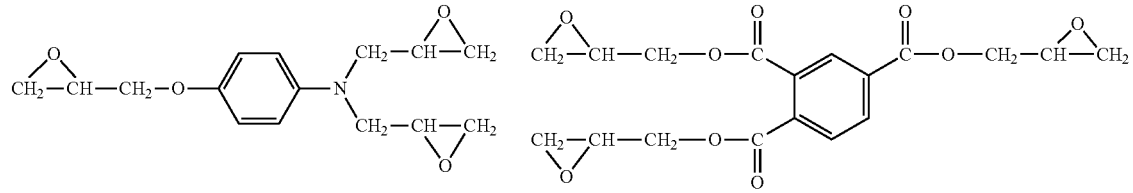
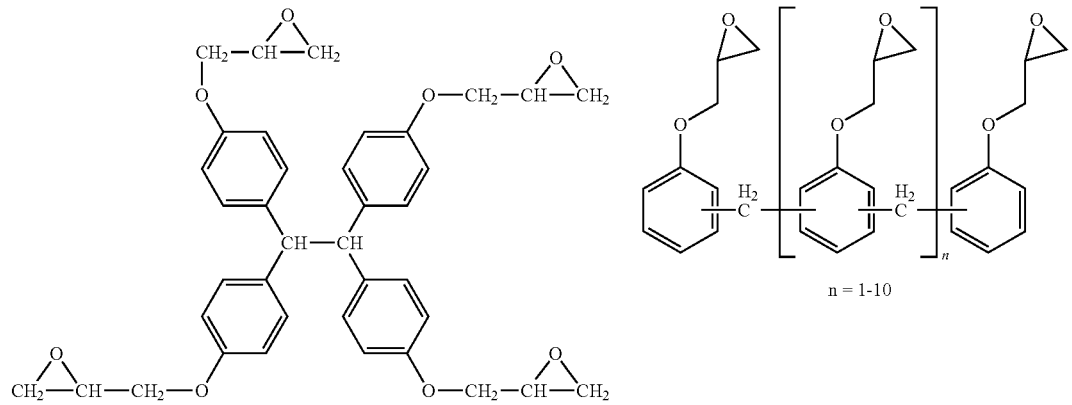
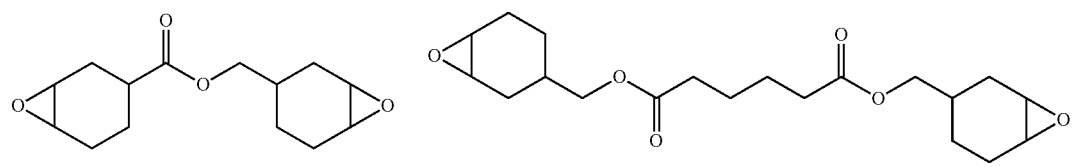

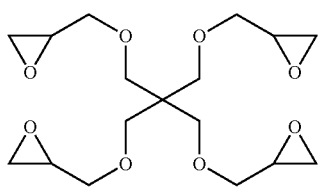

Suitable antistatic agents are, for example, ethoxylated alkylamines, fatty acid esters, alkylsulfonates, and polymers such as polyetheramides.

Suitable antiozonants are the above-named amines such as N,N'-di-isopropyl-p-phenylenediamine, N,N'-di-sec-butyl-p-phenylenediamine, N,N'-bis(1,4-dimethylpentyl)-p-phenylenediamine, N,N'-dicyclohexyl-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine. Suitable rheology modifiers, e.g. for the preparation of controlled rheology polypropylene (CR-PP), are, for example, peroxides, alkoxyaminoesters, oxymide sulfonic acid esters, and in particular the following structures:

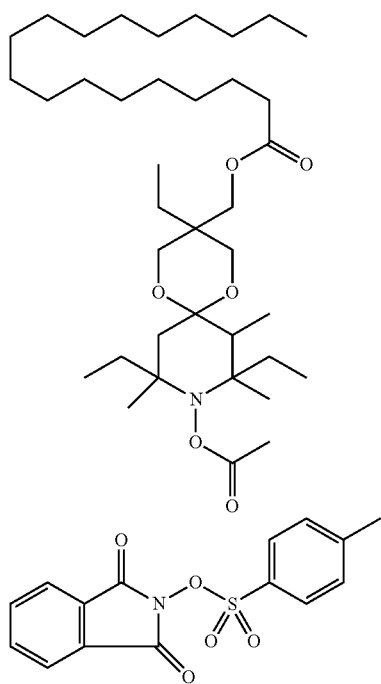

Suitable nucleation agents are, talcum, alkali, or alkaline earth salts of mono- and polyfunctional carboxylic acids such as benzoic acid, succinic acid, adipic acid, e.g. sodium benzoate, zinc glycerolate, aluminiumhydroxy-bis(4-tert-butyl)benzoate, 2,2'-methylene-bis-(4,6-di-tert-butylphenyl) phosphate, and trisamides and diamides such as trimesic acid tricyclohexylamide, trimesic acid tri (4-methylcyclohexylamide), trimesic acid tri (tert-butylamide), N,N',N''-1,3,5 benzoltriyltris(2,2-dimethyl-propanamide) or 2,6-naphthalene dicarboxylic acid cyclohexylamide.

Suitable additives for the linear molecular weight makeup of polycondensation polymers (chain extenders) are diepoxides, bis-oxazonlines, bis-oxazolones, bis-oxazines, diisoscyanates, dianhydrides, bis-acyllactams, bis-maleimides, dicyanates, carbodiimides. Further suitable chain extenders include polymer compounds such as polystyrene polyacrylate polyglycidyl(meth)acrylate copolymers, polystyrene maleic acid anhydride copolymers, and polyethylene maleic acid anhydride copolymers.

Suitable additives to increase the electrical conductivity are, for example, the mentioned static inhibitors, black carbon, and carbon compounds such as carbon nanotubes and graphene, metal powders such as copper powder, and conductive polymers such as polypyrroles, polyanilines, and polythiopenes. Suitable additives to increase thermal conductivity are, for example, aluminum nitrides and boron nitrides.

Suitable infrared-active additives are, for example, aluminum silicates or dyestuffs such as phthalocyanines or anthraquinones.

Suitable demolding agents are, for example, silicones, soaps, and waxes, such as montan waxes.

The incorporation of components (A) and (B) and optionally of the additional additives into the plastic recyclate takes place by typical processing methods, with the polymers being melted and being mixed with the additive composition in accordance with the invention and the optional further additives, preferably by mixers, kneaders and extruders. Extruders, such as single-screw extruders, twin-screw extruders, planetary gear extruders, ring extruders, co-kneaders, are preferred processing machines and are preferably equipped with a vacuum degassing means. The processing can here take place under air or optionally under inert gas conditions such as under nitrogen.

Components (A) and (B) can furthermore be manufactured and introduced in the form of so-called master batches or concentrates that, for example, comprise 10-90% of a stabilizer composition comprising components (A) and (B) in a polymer.

It is further preferred that the thermoplastic plastic recyclate is selected from the group consisting of
 a) recycled polymers of olefins or diolefins such as polyethylene, in particular LDPE, LLDPE, VLDPE, ULDPE, MDPE, HDPE, and UHMWPE, metallocene PE (mPE), polypropylene, polyisobutylene, poly-4-methyl-pentene-1, polybutadiene, polyisoprene, polycyclooctene, polyalkylene carbon monoxide copolymers, and corresponding copolymers in the form of statistical or block structures such as polypropylene-polyethylene (EP), EPM or EPDM, ethylene vinyl acetate (EVA), ethylene acrylic ester such as ethylene butyl acrylate, ethylene acrylic acid glycidyl acrylate, and corresponding graft polymers such as polypropylene-g-maleic acid anhydride, polypropylene-g-acrylic acid, and polyethylene-g-acrylic acid.
 b) recycled polystyrene, polymethyl styrene, polyvinyl naphthalene, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile acrylate (ASA), styrene ethylene, styrene maleic acid anhydride polymers, including corresponding graft copolymers such as styrene on butadiene, maleic acid anhydride on SBS or SEBS, and graft copolymers of methyl methacrylate, styrene butadiene, and ABS (MABS),
c) recycled polymers of unsaturated esters such as polyacrylates and polymethacrylates such as polymethyl methacrylate (PMMA), polybutyl acrylate, polyauryl acrylate, poly stearyl acrylate, polyacrylonitrile, and corresponding polyacrylamides, copolymers such as polyacrylonitrile-polyalkylacrylate,
d) recycled polymers of unsaturated alcohols and derivatives such as polyvinyl alcohol, polyvinyl acetate, polyvinyl butyral,
e) recycled polyacetates such as polyoxymethylene (POM), and corresponding copolymers such as copolymers with butanal,
f) recycled polyphenylene oxides and blends with polystyrene or polyamides,
g) recycled polymers of cyclic ethers such as polyethylene glycol, polypropylene glycol, polyethylene oxide, polypropylene oxide,
h) recycled polyurethanes of hydroxy terminated polyethers or polyesters and aromatic or aliphatic isocynates, in particular linear polyurethanes, polyureas,
i) recycled polyamides such as polyamide-6, 6.6, 6.10, 4.6, 4.10, 6.12, 12.12, polyamide 11, polyamide 12 and (partly) aromatic polyamides such as polyphthalamides, e.g. prepared from terephthalic acid and/or isophthalic acid and aliphatic diamines or from aliphatic dicarboxylic acids such as adipic acid or sebacic acid and aromatic diamines such as 1,4- or 1,3-diaminobenzol,
j) recycled polyimides, polyamide imides, polyether imides, polyester imides, poly(ether)ketones, polysulfones, polyether sulfones, polyaryl sulfones, polyphenylene sulfides, polybenzimide azoles, polyhydantoines,
k) recycled polyesters of aliphatic or aromatic dicarboxylic acids and diols or of hydroxy carboxylic acids such as polyethylene terephthalate (PET), polybutylene terephthalate (PBT), polypropylene terephthalate, polyethylene naphthylate, poly-1,4-dimethylocyclohexane terephthalate, polyhydroxy benzoate, polyhydroxy napththalate, polylactic acid,
l) recycled polycarbonates, polyester carbonates, and blends thereof such as PC/ABS, PC/PBT, PC/PET/PBT,
m) recycled halogenated polymers such as PVC, PVDC,
n) recycled cellulose derivatives such as cellulose nitrate, cellulose acetate, cellulose propionate, cellulose butyrate,
o) and mixtures, combinations, or blends of two or more of the above-named polymers.

The thermoplastic plastic recyclate is particularly preferably selected from the group consisting of polymers of olefins or diolefins such as polyethylene, in particular LDPE, LLDPE, VLDPE. ULDPE, MDE, HDPE, and UHMWPE, metallocene PE (m-PE), polypropylene, polyisobutylene, poly-4-methyl-pentene-1, polybutadiene, polyisoprene, polycyclooctene, polyalkylene carbon monoxide copolymers, and corresponding copolymers in the form of statistical or block structures such as polypropylene-polyethylene (EP), EPM or EPDM, ethylene vinyl acetate (EVA), ethylene-acrylic esters such as ethylene butyl acrylate, ethylene acrylic acid glycidyl acrylate, and corresponding graft polymers such as polypropylene-g-maleic acid anhydride, polypropylene-g-acrylic acid, and polyethylene acrylic acid.

The thermoplastic is very particularly preferably a polyolefin recyclate. The thermoplastic plastic recyclate can, for example, be polypropylene, that is in particular a polypropylene recyclate or polyethylene, that is in particular a polyethylene recyclate.

In the method in accordance with the invention,
$(A)_{0.02}$ to 3 parts by weight, preferably 0.03 to 0.5 parts by weight, of at least one substituted sugar, and
$(B)_{0.04}$ to 6 parts by weight, preferably 0.06 to 1 parts by weight, of at least one primary antioxidant and/or at least one secondary antioxidant are furthermore preferably introduced into 91 to 99.94 parts by weight, preferably 98.5 to 99.91 parts by weight. of at least one thermoplastic plastic recyclate.

It is further preferred that
$(A)_{0.02}$ to 3 parts by weight, preferably 0.03 to 0.5 parts by weight, of at least one substituted sugar,
$(B1)_{0.02}$ to 3 parts by weight, preferably 0.03 to 0.5 parts by weight, of at least one primary antioxidant,
$(B2)_{0.02}$ to 3 parts by weight, preferably 0.03 to 0.5 parts by weight, of at least one secondary antioxidant are introduced into 91 to 99.94 parts by weight, preferably 98.5 to 99.91 parts by weight, of at least one thermoplastic plastic recyclate.

The present invention further relates to a plastic composition comprising or consisting of
(A) at least one substituted sugar (component (A)), and
(B) at least one thermoplastic plastic recyclate.

In this case—with the exception of the primary and/or secondary antioxidants already contained in the recyclate-no further primary and/or secondary (fresh) antioxidants are admixed in the plastic composition.

The primary and/or secondary antioxidants contained in the recyclate and their degradation products can, where required, be determined by conventional analytical methods familiar to the skilled person, e.g. by chromatographic methods such as HPLC, optionally after extraction from the polymers by means of a suitable solvent, and subsequent concentration by removal of the solvent.

The present invention additionally also relates to a plastic composition comprising or consisting of
(A) at least one substituted sugar,
(B) at least one primary antioxidant and/or at least one secondary antioxidant; and
(C) at least one thermoplastic plastic recyclate.

In a preferred embodiment, the plastic composition is characterized in that the plastic composition comprises or consists of
$(A)_{0.02}$ to 3 parts by weight, preferably 0.03 to 0.5 parts by weight, of at least one substituted sugar;
$(B)_{0.04}$ to 6 parts by weight, preferably 0.06 to 1 parts by weight, of at least one primary antioxidant and/or of at least one secondary antioxidant, and
$(C)_{91}$ to 99.94 parts by weight, preferably 98.5 to 99.91 parts by weight of at least one thermoplastic.

The composition in accordance with the invention preferably comprises at least one primary antioxidant and at least one secondary antioxidant.

A further preferred embodiment is characterized in that the plastic composition comprises or consists of
$(A)_{0.02}$ to 3 parts by weight, preferably 0.03 to 0.5 parts by weight, of at least one substituted sugar;

(B1)$_{0.02}$ to 3 parts by weight, preferably 0.03 to 0.5 parts by weight, of at least one primary antioxidant;
(B2)$_{0.02}$ to 3 parts by weight, preferably 0.03 to 0.5 parts by weight, of at least one secondary antioxidant, and
(C)$_{91}$ to 99.94 parts by weight, preferably 98.5 to 99.91 parts by weight of at least one thermoplastic plastic recyclate.

In accordance with a further preferred embodiment the plastics composition according to the invention additionally contains at least one additive which is selected from the group consisting of UV absorbers, light stabilizers, metal deactivators, filler deactivators, antiozonants, nucleation agents, antinucleation agents, impact modifiers, plasticizers, lubricants, rheology modifiers, thixotropy agents, chain extenders, optical brighteners, antimicrobial active substances, antistatic agents, slip agents, antiblocking agents, coupling means, crosslinking agents, anticrosslinking agents, hydrophilizing agents, hydrophobing agents, adhesion promoters, dispersants, compatibilizers, oxygen scavengers, acid scavengers, propellants, degradation additives, antifoaming agents, odor scavengers, markers, antifogging agents, fillers, reinforcements, and mixtures hereof.

It is furthermore preferred that the plastics composition additionally contains at least one additive which is selected from the group consisting of
a) acid scavengers, preferably calcium stearate, magnesium stearate, zinc stearate, aluminum stearate, calcium stearate, calcium lactate, calcium stearoyl-2-lactate, hydrotalcites, in particular synthetic hydrotalcites based on aluminum, magnesium and zinc, hydrocalumites, zeolites, alkaline earth oxides, in particular calcium oxide and magnesium oxide, zinc oxide, alkaline earth carbonates, in particular calcium carbonate, magnesium carbonate and dolomite, and hydroxides, in particular brucite,
b) light stabilizers, preferably light stabilizers from the group of hindered amines,
c) dispersants,
d) filler deactivators, and
mixtures thereof.

If only a substituted sugar is added to the recyclate as a stabilizer, the further additive is in particular an acid scavenger in a preferred embodiment. Preferred acid scavengers are defined above.

The plastic composition in accordance with the invention can preferably be manufactured or has been manufactured using a method in accordance with the invention for the stabilization of thermoplastics against oxidative, thermal, and/or actinic degradation.

All the preferred variants, exemplary embodiments, and comments (e.g. with respect to possible components and additives to be used) described with respect to the method in accordance with the invention also apply accordingly to the plastic composition in accordance with the invention.

The present invention also relates to a molding compound or to a molded part that can be manufactured from a plastic composition in accordance with the invention, in particular in the form of injection molded parts, foils, films, lacquers, coatings, foams, fibers, cables, tubes, sections, hollow bodies, ribbons, membranes, e.g. geo-membranes, lubricants, colorants, and/or adhesives that are manufactured by extrusion, injection molding, blow molding, calendering, pressing processes, spinning processes, and or rotomolding, e.g. for the electrical industry, for the construction industry, for the transport industry (automotive, aircraft, railroad), for medical applications, for domestic and electric appliances, for vehicle parts, for consumer products, for packaging, for furniture, and/or for textiles. The present invention further also relates to a stabilizer composition for the stabilization of thermoplastic plastic recyclates, preferably thermoplastic plastic recyclates, against oxidative, thermal, and/or actinic degradation, comprising
(A) at least one substituted sugar, and
(B) at least one primary antioxidant and/or at least one secondary antioxidant.

All the preferred variants, exemplary embodiments, and comments (e.g. with respect to possible components and additives to be used) already described with respect to the method in accordance with the invention and with respect to the plastic composition in accordance with the invention also apply accordingly to the stabilizer composition in accordance with the invention.

The present invention also relates to the use of at least one substituted sugar for the stabilization of thermoplastic plastic recyclates against oxidative, thermal, and/or actinic degradation.

The present invention further relates to the use of the stabilizer composition in accordance with the invention or of a stabilizer composition comprising or consisting of
(A) at least one substituted sugar and
(B) at least one primary antioxidant and/or at least one secondary antioxidant
for the stabilization of thermoplastics, preferably thermoplastic plastic recyclates, against oxidative, thermal, and/or actinic degradation.

Preferred thermoplastics are here the same as those named with respect to the method in accordance with the invention and to the plastic composition in accordance with the invention.

The stabilizer composition is particularly preferably used for the stabilization of polyolefin recyclates and against oxidative, thermal, and/or actinic degradation.

All the preferred variants, exemplary embodiments, and comments (e.g. with respect to possible components and additives to be used) already described with respect to the method in accordance with the invention and with respect to the plastic composition in accordance with the invention and with respect to the stabilizer composition in accordance with the invention also apply accordingly to the use of the stabilizer composition in accordance with the invention.

The present invention will be described in more detail with reference to the following embodiments without restricting the invention to the specifically shown examples.

A post-consumer polypropylene recyclate from accumulator box ground stock (supplier: BSB Braubach) together with the additives given in the Table was conveyed in a circle in the melt at 210° C. in a twin screw microextruder (MC 5, manufacturer DSM) in continuous mode at 90 revolutions a minute for 30 minutes to check the effect of the stabilizer composition in accordance with the invention. The force absorption is measured in each case after 10, 20, and 30 minutes. The force is a measure for the toughness of the melt and thus for the molecular weight. The higher the remaining force (after a melting time of 2 minutes=100%), the smaller the degradation of the polymer.

The addition of 0.1 to 0.3% of a stearoyl substituted mannitol (>90% monosubstituted) results, in comparison with a recyclate without additive, in increased processing stabilization, i.e. in a higher residual force. A further improvement of the processing stability is achieved in that 0.1% primary antioxidant (penta-erythritol-tetrakis[3-(3,5-di-tert-butyl-4-hydroxyphenyl) propionate) and 0.1% secondary antioxidant (tris-(2,4-di-tert-butylphenyl)phosphite) are added to 0.2% of the stearoyl substituted mannitol.

In an analog manner, the addition of the distearyl ester of the mucic acid in a concentration of 0.1 to 0.5%, in comparison with a polypropylene recyclate without additive, results in increased processing stabilization, i.e. in a higher residual force after 30 minutes.

Combinations of a stearoyl substituted mannitol were further processed in a concentration of 0.2% in
1) LLDPE/LDPE film agglomerates from industrial collections together with 0.2% octadecyl-3-(3,5-di-tert-butyl-4-hydroxyphenyl) propionate at 210° C.
2) polyethylene/polypropylene mixture of treated recyclate collections together with 0.1% pentaerythritol-tetrakis[3-(3,5-di-tert-butyl-4-hydroxyphenyl) propionate) and 0.1% (tris-(2,4-di-tert-butylphenyl) phosphite at 210° C.
3) polylactide (PLA) from used beverage cups together with 0.1% pentaerythritol-tetrakis[3-(3,5-di-tert-butyl-4-hydroxyphenyl) propionate at 200° C.
4) polystyrene from recyclate collections with 0.1% Wingstay L (reaction product) of 4-methylphenol with dicyloppentadiene and isobutene) at 230° C.

Improved processing stabilization results in all cases in comparison with non-post stabilized recyclate.

The invention claimed is:

1. A method for stabilization of a thermoplastic plastic recyclate against oxidative, thermal, and/or actinic degradation, comprising
introducing component (A) into the thermoplastic plastic recyclate, wherein the component (A) is at least one substituted sugar selected from the group consisting of an ester of an alditol having at least four carbon atoms, an ether of an alditol having at least four carbon atoms, an ester of a cyclitol, an ether of a cyclitol, an ester of a saccharic acid, an amide of an amino sugar, and a substituted amine of an amino sugar.

2. The method in accordance with claim 1, wherein the at least one substituted sugar comprises at least three free OH groups.

3. The method in accordance with claim 1, wherein the at least one substituted sugar is mono- or di-substituted.

4. The method in accordance with claim 1, wherein the alditol from which the ester or ether is formed has the molecular formula

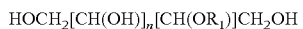

where n=2-6, where $R_1$ is an optionally substituted sugar residue.

5. The method in accordance with claim 1, wherein the alditol from which the ester or ether is formed is selected from the group consisting of threitol, erythritol, galactinol, mannitol, ribitol, sorbitol, xylitol, arabitol, ismaltol, lactitol, maltitol, maltotritol, hydrated oligosaccharides, and polysaccharides with polyol end groups.

6. The method in accordance with claim 1, wherein the cyclitol from which the ester or ether is formed is selected from the group consisting of inositol, quercitol, viscumitol, bornesitol, conduritol, ononitol, pinitol, pinpollitol, ciceritol, quebrachitol, quinic acid, shikimic acid, and valienol.

7. The method in accordance with claim 1, wherein the saccharic acid from which the ester or ether is formed is selected from the group consisting of aldonic acids and aldaric acids.

8. The method in accordance with claim 1, wherein the saccharic amine from which the ester or ether is formed is selected from the group consisting of 1-amino-1-deoxyalditols and alpha-omega-diamino-alpha-omega-dideoxyalditols.

9. The method in accordance with claim 1, wherein the at least one substituted sugar is selected from the group consisting of the following compounds:

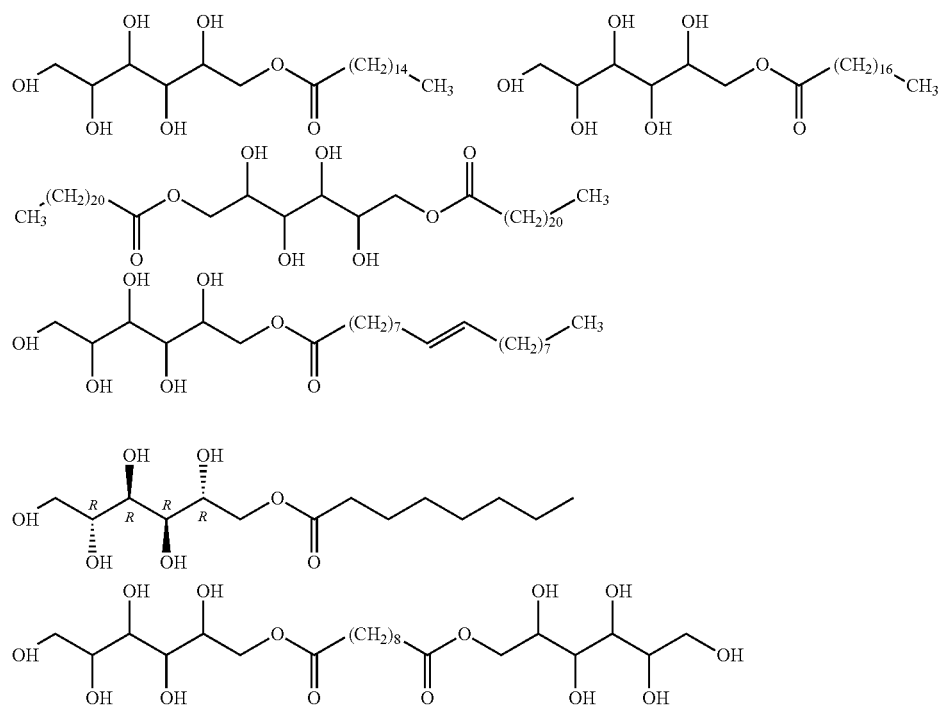

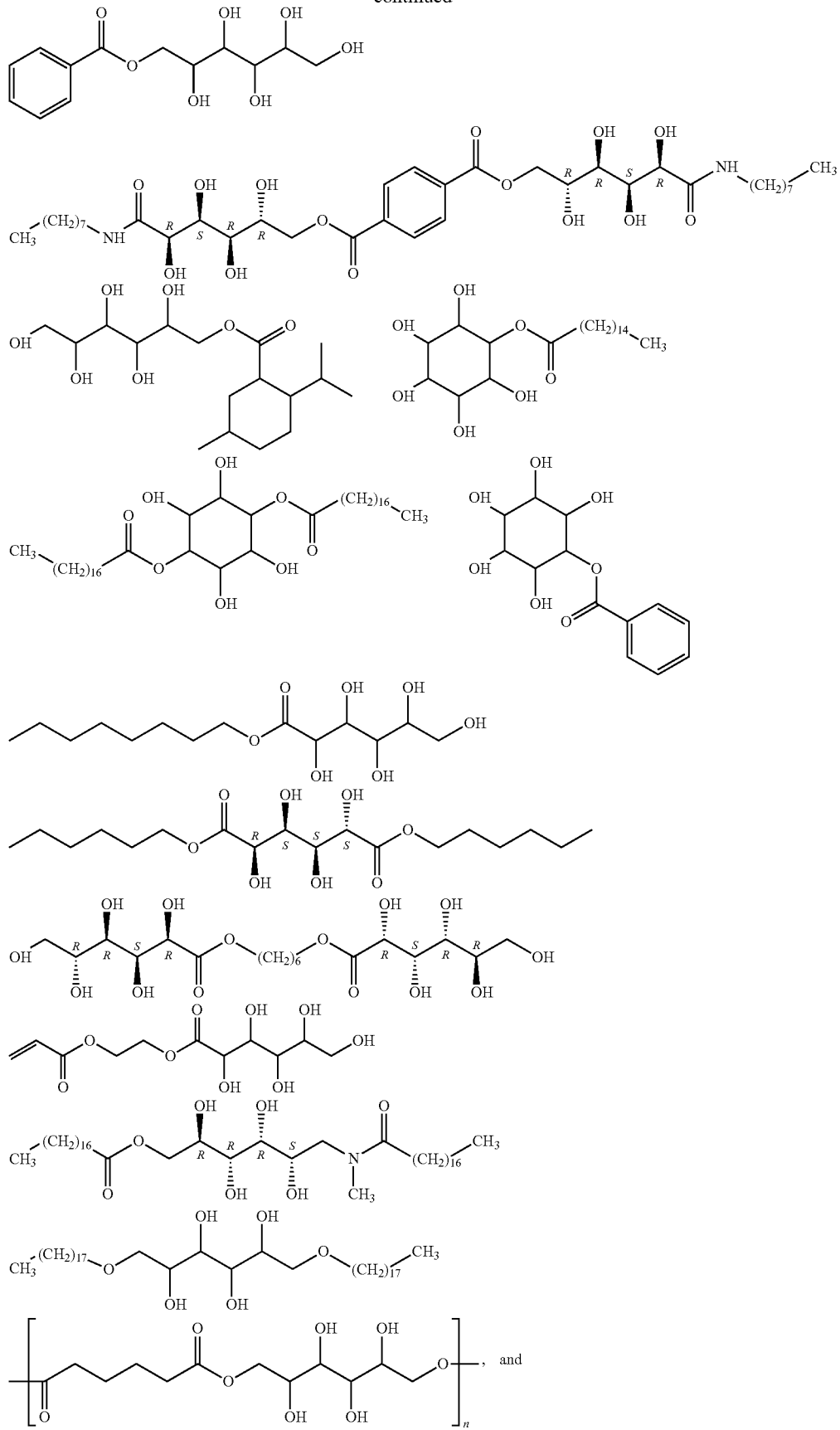

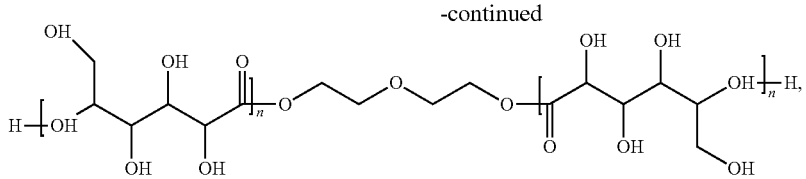

where n is the same or different on every occurrence and is an integer between 1 and 100.

10. The method in accordance with claim 1, wherein 0.01 to 5.0 parts by weight of the at least one substituted sugar (component (A)) is introduced into 95.0 to 99.99 parts of the thermoplastic plastic recyclate.

11. The method in accordance with claim 1, wherein, in addition to the at least one substituted sugar, at least one primary antioxidant and/or at least one secondary antioxidant (component (B)) is/are introduced into the thermoplastic plastic recyclate.

12. The method in accordance with claim 11, wherein the at least one primary antioxidant is selected from the group consisting of phenolic antioxidants, amines, and lactones.

13. The method in accordance with claim 11, wherein the at least one secondary antioxidant is selected from the group consisting of phosphorus compounds and organo-sulfur compounds.

14. The method in accordance with claim 11, wherein at least one primary antioxidant and at least one secondary antioxidant are introduced into the thermoplastic plastic recyclate.

15. The method in accordance with claim 11, wherein component (A) and component (B) are introduced into the thermoplastic recyclate in a weight ratio of 95:5 to 5:95.

16. The method in accordance with claim 11, wherein component (A) and/or component (B) are introduced by
   mixing the component (A) and/or component (B) present as solids with the thermoplastic plastic recyclate present as a solid, melting the mixture thereby produced, and subsequent cooling; or
   melting the component (A) and component (B) present as solids and introducing the melt thus produced into a melt of the thermoplastic plastic recyclate.

17. The method in accordance with claim 11, wherein, with respect to 91 to 99.94 parts by weight of the thermoplastic plastic recyclate,
   (A) 0.02 to 3 parts by weight of at least one substituted sugar (component (A)); and
   (b) 0.04 to 6 parts by weight of the at least one primary antioxidant and/or of at least one secondary antioxidant (component (B)) are introduced.

18. The method in accordance with claim 1, wherein the thermoplastic plastic recyclate contains one or more of a) to n), which are as follows:
   a) recycled polymers of olefins and/or diolefins,
   b) recycled polystyrene, polymethyl styrene, polyvinyl naphthalene, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile acrylate (ASA), styrene ethylene, styrene maleic acid anhydride polymers, graft copolymers of styrene on butadiene, maleic acid anhydride on SBS or SEBS, and graft copolymers of methyl methacrylate, styrene butadiene, and/or ABS,
   c) recycled polymers of unsaturated esters,
   d) recycled polymers of unsaturated alcohols and/or derivatives,
   e) recycled polyacetates and/or corresponding copolymers,
   f) recycled polyphenylene oxides and/or blends with polystyrene or polyamides,
   g) recycled polymers of cyclic ethers,
   h) recycled polyurethanes of hydroxy terminated polyethers or polyesters and aromatic or aliphatic isocyanates,
   i) recycled polyamides,
   j) recycled polyamide imides, polyether imides, polyester imides, poly(ether)ketones, polysulfones, polyether sulfones, polyaryl sulfones, polyphenylene sulfides, polybenzimide azoles, and/or polyhydantoines,
   k) recycled polyesters of aliphatic or aromatic dicarboxylic acids and diols or of hydroxy carboxylic acids,
   l) recycled polycarbonates, polyester carbonates, and/or blends thereof,
   m) recycled halogenated polymers, and
   n) recycled cellulose derivatives.

19. The method in accordance with claim 18, wherein the recycled polymers of olefins and diolefins are selected from the group consisting of polyethylene, polypropylene, polyisobutylene, poly-4-methyl-pentene-1, polybutadiene, polyisoprene, polycyclooctene, polyalkylene-carbon monoxide copolymers, EPM, EPDM, ethylene-vinyl acetate (EVA), ethylene-acrylic esters, ethylene-acrylic acid glycidyl acrylate, polypropylene-g-maleic acid anhydride, polypropylene-g-acrylic acid, and polyethylene-g-acrylic acid.

20. The method in accordance with claim 19, wherein the polyethylene is selected from the group consisting of LDPE, LLDPE, VLDPE ULDPE, MDPE, HDPE, UHMWPE, and metallocene PE (m-PE).

21. A plastic composition comprising at least one substituted sugar and at least one thermoplastic recyclate,
   wherein the at least one substituted sugar is selected from the group consisting of an ester of an alditol having at least four carbon atoms, an ether of an alditol having at least four carbon atoms, an ester of a cyclitol, an ether of a cyclitol, an ester of a saccharic acid, an amide of an amino sugar, and a substituted amine of an amino sugar.

22. The plastic composition in accordance with claim 21, wherein the plastic composition comprises
   0.01 to 5.0 parts by weight of the at least one substituted sugar and
   95.0 to 99.99 parts by weight of the at least one thermoplastic plastic recyclate.

23. The plastic composition in accordance with claim 21, further comprising at least one primary antioxidant and/or at least one secondary antioxidant.

24. The plastic composition in accordance with claim 23, wherein the plastic composition comprises
   0.02 to 3 parts by weight of the at least one substituted sugar, 0.04 to 6 parts by weight of the at least one primary antioxidant and/or the at least one secondary antioxidant, and 91 to 99.94 parts by weight of the at least one thermoplastic plastic recyclate.

25. The plastic composition in accordance with claim 23, wherein the plastic composition comprises 0.02 to 3 parts by weight of the at least one substituted sugar, 0.02 to 3 parts by weight of the at least one primary antioxidant, 0.02 to 3 parts by weight of the at least one secondary antioxidant, and 91 to 99.94 parts by weight of the at least one thermoplastic plastic recyclate.

26. The plastic composition in accordance with claim 21, wherein the plastic composition additionally comprises at least one additive selected from the group consisting of UV absorbers, light stabilizers, metal deactivators, filler deactivators, antiozonants, nucleation agents, anti-nucleation agents, impact strength enhancers, plasticizers, lubricants, rheology modifiers, thixotropic agents, chain extenders, optical brighteners, antimicrobial active agents, antistatic agents, slip agents, anti-blocking agents, coupling agents, crosslinking agents, anti-cross-linking agents, hydrophilization agents, hydrophobing agents, bonding agents, dispersing agents, compatibilizers, oxygen scavengers, acid scavengers, expanding agents, degradation additives, defoaming agents, odor scavengers, marking agents, anti-fogging agents, fillers, and reinforcement agents.

27. The plastic composition in accordance with claim 21, wherein the plastic composition additionally comprises at least one additive that is selected from the group consisting of a) acid scavengers,
b) light stabilizers,
c) dispersants, and
d) filler deactivators.

28. A molded part comprising the plastic composition of claim 21, wherein the molded part is in a form selected from the group consisting of an injection molded part, a foil, a film, a lacquer, a coating, a foam, a fiber, a cable, a tube, a section, a hollow body, a ribbon, and a membrane, wherein the molded part is manufactured by a process selected from the group consisting of extrusion, injection molding, blow molding, calendering, pressing, spinning, and rotomolding.

* * * * *